(12) United States Patent
Putra et al.

(10) Patent No.: US 8,417,553 B2
(45) Date of Patent: Apr. 9, 2013

(54) INCIDENT COMMUNICATION SYSTEM

(75) Inventors: Cintawati Putra, Burbank, CA (US); Gaylene Sue Kelly, Los Angeles, CA (US); Geoffrey Paul Schemel, Chino, CA (US); Michael James Doyle, Simi Valley, CA (US)

(73) Assignee: Everbridge, Inc., Glendale, CA (US)

( * ) Notice: Subject to any disclaimer, the term of this patent is extended or adjusted under 35 U.S.C. 154(b) by 496 days.

(21) Appl. No.: 12/579,382

(22) Filed: Oct. 14, 2009

(65) Prior Publication Data

US 2011/0087510 A1    Apr. 14, 2011

(51) Int. Cl.
*G06Q 30/00* (2012.01)

(52) U.S. Cl.
USPC ................................ 705/7.14; 705/7.15

(58) Field of Classification Search ........... 705/7.14, 705/7.15
See application file for complete search history.

(56) References Cited

U.S. PATENT DOCUMENTS

| 2006/0047543 | A1* | 3/2006 | Moses | 705/7 |
| 2008/0140303 | A1* | 6/2008 | Hiruta et al. | 701/116 |
| 2008/0175356 | A1* | 7/2008 | Seidberg et al. | 379/45 |
| 2008/0314681 | A1* | 12/2008 | Patel et al. | 182/18 |
| 2009/0054029 | A1* | 2/2009 | Hogberg et al. | 455/404.2 |
| 2009/0284348 | A1* | 11/2009 | Pfeffer | 340/7.3 |

OTHER PUBLICATIONS

Shen, Stella and Shaw, Michael, "Managing Coordination in Emergency Response Systems with Information Technologies" (Dec. 31, 2004). AMCIS 2004 Proceedings. Paper 252.*
H.A. Reijers et al, "Workflow Management Systems + Swarm Intelligence = Dynamic Task Assignment for Emergency Management Applications" 2007. Business Process Management Lecture Notes in Computer Science vol. 4714, pp. 125-140.*
Terrell, Ivanna S., "Understanding 911 Dispatch Teams Across Context: Implications for Theory, Information Technology, and Practice." The Pennsylvania State University, May 2006.*
ESRI, "Geospatial Computer-Aided Dispatch: An ESRI White Paper." ESRI, Dec. 2007.*

* cited by examiner

*Primary Examiner* — Jonathan G Sterrett
*Assistant Examiner* — Amanda Gurski
(74) *Attorney, Agent, or Firm* — Fish & Richardson P.C.

(57) ABSTRACT

Methods, systems, and apparatus, including computer programs encoded on a computer storage medium are presented, for providing incident notifications. The systems and processes disclosed here automatically generate and send notifications relating to an incident in accordance with an enterprise's business rules and provide real time reporting of all communications relating to the incident.

32 Claims, 29 Drawing Sheets

| ENTER INCIDENT DETAILS | REPORT INCIDENT |

REPORT INCIDENT

FIELDS MARKED WITH * ARE MANDATORY

MESSAGE TEMPLATE: [ALERT: #INCIDENT TYPE# ▼]  *ADVANCED SEARCH*
NOTIFICATION TYPE: [STANDARD ▼]  LANGUAGE: [ENGLISH (US) ▼]

TITLE:* [ALERT: EARTH MOVEMENT]

MESSAGE:* [PLEASE BE AWARE THAT EARTH MOVEMENT OCCURRED AT CALIFORNIA WITH A SEVERITY OF 3. THE PIPELINE AND HAZARD CODE ARE 33-N AND 95.]

550

[2372] CHARACTERS REMAINING    [ATTACH FILE]

570 — *ADVANCED DELIVERY OPTIONS*

FILE ATTACHMENT
FILE 1: [            ] [BROWSE...]
ATTACH MORE FILES (YOU MAY ATTACH UP TO FIVE FILES. EACH FILE MUST BE 2MB OR LESS AND THE TOTAL ATTACHMENT SIZE MUST BE 5MB OR LESS.)

580 — [EDIT RESPONDERS]

590 — [SEND MESSAGE]

DELIVERY PROFILE

FIELDS MARKED WITH * ARE MANDATORY
PROFILE NAME: URGENT ALERT

BROADCAST RESULTS:
☑ ON-LINE RESULTS:
☐ E-MAIL:
☐ FAX:

DELIVERY OPTIONS

| | | |
|---|---|---|
| ☑ CONFIRM | • BROADCAST DURATION * | 1 HRS |
| ☐ ESCALATE | • CONTACT CYCLES * | 1 |
| | • INTERVAL BETWEEN DELIVERY METHODS | 0 ▼ MINS |
| | • INTERVAL BETWEEN CYCLES | 00 ▼ MINS |

• VOICE MAIL PREFERENCE:  ○ NO MESSAGE   ⦿ MESSAGE ONLY   ○ MESSAGE WITH CONFIRMATION INFO
• SEND ATTACHMENT(S) TO: E-MAIL AND FAX ▼

DELIVERY METHODS

| | | |
|---|---|---|
| ☑ 1 MOBILE PHONE | ☐ 9 ONE WAY SMS | ☐ 17 TAP PAGER |
| ☑ 2 E-MAIL ADDRESS | ☑ 10 SMS | |
| ☐ 3 BUSINESS PHONE | ☑ 11 IM | |
| ☐ 4 FAX | ☐ 12 TTY/TDD | |
| ☐ 5 PAGER | ☐ 13 TEXT DEVICE LMTD | |
| ☐ 6 INTERNATIONAL PHONE | ☐ 14 CALL BACK | |
| ☐ 7 ONE WAY PAGER LMTD | ☐ 15 TEXT DEVICE UNLTD | |
| ☐ 8 ONE WAY PAGER UNLTD | ☐ 16 RADIO PHONE | |

[SAVE]
CLOSE

BROADCAST RESULTS - 1110741　　　　　　　　　　　　　　　　[STOP BROADCAST]
(EMERGENCY NOTIFICATION)

| | |
|---|---|
| MESSAGE TITLE | ALERT: EARTH MOVEMENT |
| MESSAGE TEXT | PLEASE BE AWARE THAT EARTH MOVEMENT OCCURRED AT CALIFORNIA WITH A SEVERITY OF 3. THE PIPELINE AND HAZARD CODE ARE 33-N AND 95. |

| | | | |
|---|---|---|---|
| INITIATED BY: | BOND, ELIZABETH | | |
| START DATE: | 08/20/2009 01:17:00 PM | FINISH DATE: | |
| ELAPSED TIME: | 14S | RESPONSE RATE: | 0.0% |
| SENDER CALLER ID: | | SENDER E-MAIL ADDR: | ELIZABETH.BOND@EVERBRIDGE.COM |
| VOICE MESSAGE: | TEXT ONLY | VOICE FILE: | |
| LANGUAGE: | ENGLISH (US) | BROADCAST DURATION: | 1 |
| CONFIRM REQUIRED: | Y | QUOTA REQUIRED: | NONE |
| ESCALATED: | N | POLLING: | N |
| CALL-IN: | N | PIN REQUIRED: | N |
| EMAIL RESULTS: | N | FAX RESULTS: | N |
| ATTACHMENT: | | ATTACHMENT SENT VIA: | |
| VOICE MAIL PREFERENCE: | MESSAGE ONLY | | |
| INCIDENT ID: | 103930 | | |
| INCIDENT TYPE: | EARTH MOVEMENT | | |
| INCIDENT LOCATION: | CALIFORNIA | | |
| INCIDENT SEVERITY: | 3 | | |

| CONFIRMED: | NOT CONFIRMED: | UNREACHABLE: |
|---|---|---|
| 0 | 1 | 1 |

MESSAGE DELIVERY OPTIONS:

• REQUESTED CYCLES  1

| MOBILE PHONE | SMS | IM |
|---|---|---|
| E-MAIL ADDRESS | | |

[◁ BACK]　[PRINT]

| | | | ELIZABETH BOND MATRIX TEST ORG ORGANIZATION | | | |
|---|---|---|---|---|---|---|
| | | | INCIDENT ID 101650 | | | |
| | | | INCIDENT ALERT: EARTH MOVEMENT | | | |
| | | | INCIDENT OPEN DATE: 08/03/2009 | | | |
| INCIDENT DATE | INCIDENT TITLE | INCIDENT ID | INCIDENT STATUS | OPENED BY | REQ FOLLOW-UP | |
| 8/3/09 1:53 PM | ALERT EARTH MOVEMENT | 101650 | OPEN | ELIZABETH BOND | NO | |
| BROADCAST DATE | BROADCAST ID | STATUS | INCIDENT TYPE | LOCATION | SEVERITY | REQUIRES FOLLOW-UP | BROADCAST TITLE |
| 8/3/09 1:53 PM | 1106001 | NEW | EARTH MOVEMENT | CALIFORNIA | 3 | N | ALERT EARTH MOVEMENT |

| SENT BY | CONFIRMED | NOT CONFIRMED | UNREACHABLE |
|---|---|---|---|
| ELIZABETH BOND | 0 | 3 | 3 |

BROADCAST MESSAGE

BROADCAST NOTE

PLEASE BE AWARE THAT EARTH MOVEMENT OCCURRED AT CALIFORNIA WITH A SEVERITY OF 3. THE PIPELINE AND HAZARD CODE ARE 12-12-12 AND 2525.

| CONTACT NAME | CONFIRMED | ATTEMPT # | ATTEMPT TIME | PATH TYPE | PATH | CALL RESULT | GROUP/FILTER |
|---|---|---|---|---|---|---|---|
| PARIS NILSON | N/C | 0 | | MOBILE PHONE | 18185684431 PROVIDER VERISON WIRELESS | NOT ATTEMPTED - DUPLICATE CONTACT INFORMATION | |
| NIECY ANDERSON | N/C | 0 | | MOBILE PHONE | 18185684431 PROVIDER VERISON WIRELESS | NOT ATTEMPTED - DUPLICATE CONTACT INFORMATION | |
| LYLA FLORES | N/C | 0 | | MOBILE PHONE | 18185684431 PROVIDER VERISON WIRELESS | NOT ATTEMPTED - DUPLICATE CONTACT INFORMATION | |
| MIKE SCHWIMMER | N/C | 1 | 8/3/09 1:55 PM | MOBILE PHONE | 18185684431 PROVIDER VERISON WIRELESS | CONNECTED-MEMBER HUNG UP | |
| SIG TYLER | N/C | 1 | 8/3/09 1:55 PM | MOBILE PHONE | 1818-230-9571 PROVIDER VERISON WIRELESS | NOT CONNECTED- NO RINGBACK | |
| PARIS NILSON | N/C | 0 | | E-MAIL ADDRESS | ELIZABETH.BOND@ EVERBRDGE.COM | NOT ATTEMPTED - DUPLICATE CONTACT INFORMATION | |
| NIECY ANDERSON | N/C | 0 | | E-MAIL ADDRESS | ELIZABETH.BOND@ EVERBRDGE.COM | NOT ATTEMPTED - DUPLICATE CONTACT INFORMATION | |
| LYLA FLORES | N/C | 0 | | E-MAIL ADDRESS | ELIZABETH.BOND@ EVERBRDGE.COM | NOT ATTEMPTED - DUPLICATE CONTACT INFORMATION | |

PAGE 1 OF 1

FIG. 6C

SEVERITIES

DEFINE THE SEVERITY VALUES THAT WILL BE USED IN YOUR NOTIFICATIONS AND PLACE THEM IN THE DESIRED ORDER.

ORDER  ● LOW TO HIGH   ○ HIGH TO LOW
NAME           DESCRIPTION

| ENTER VALUE | ENTER DESCRIPTION | ADD |

MAX 20 CHARS    MAX 70 CHARS 1-1
2-2
3-3
4-4
5-5

EDIT OR 🗑

[BACK] [SAVE]

ADDITIONAL INFORMATION

[ADD]

FIELD NAME: MAX 30 CHARS

FIELD NAME: PIPELINE NUMBER / HAZARD CODE

DISPLAY FORMAT: DROPDOWN

REQUIRED: NO

[ADD]

VALUE: MAX 40 CHARS

LIST OF VALUES: 95, 85, 75

☐ Default

[BACK] [SAVE]

FIG. 8D

RESPONDER ROLES

DEFINE THE RESPONDER ROLES THAT WILL BE USED IN YOUR ORGANIZATION.

| ENTER NEW RESPONDER ROLE | [ADD] |

MAX 100 CHARS

```
SECURITY
MAINTENANCE
EMERGENCY RESPONDER
CLEAN-UP CREW
PIPELINE ENGINEER
```

EDIT OR 🗑

[BACK] [SAVE]

FIG. 9A

MEMBER PROFILE ATTRIBUTES

[   ] [ADD]
ATTRIBUTE NAME: MAX 25 CHARS

ATTRIBUTE NAME LIST:
- DRUG TEST
- INJURED
- AFFILIATION
- CAUSE OF INJURY
- INCIDENT WITNESS

DATA TYPE: TEXT

DISPLAY FORMAT: SCROLLLIST

[   ] [ADD]
VALUE NAME: MAX 100 CHARS

VALUE NAME LIST:
- DEFECTIVE/INADEQUATE SAFETY DEVICES, TOOLS OR EQUIPMENT
- IMPROPER OPERATION OF SAFETY DEVICES, TOOLS OR EQUIPMENT
- IMPROPER LOADING OR PLACING
- HAZARDOUS ENVIRONMENT (GASES, DUST, SMOKE, FUMES OR VAPORS)
- CONGESTED WORK AREA/DISORDERLY WORKPLACE
- OTHER

[BACK] [SAVE]

FIG. 9B

RESPONDER ROLE MAPPING

MAPPING ID: NEW

| 1- SELECT INCIDENT TYPE | 2- SELECT SEVERITY | 3- SELECT RESPONDER ROLE | | RESPONDER ROLES |
|---|---|---|---|---|
| SELECT VALUE ▾ | SELECT VALUE ▾ | CLEAN-UP CREW<br>EMERGENCY RESPONDER<br>MAINTENANCE<br>PIPELINE ENGINEER | ADD<br>REMOVE | |

SAVE

8 ITEMS FOUND, DISPLAYING ALL ITEMS.

| MAPPING ID | INCIDENT TYPE | SEVERITY | RESPONDER ROLES | REMOVE |
|---|---|---|---|---|
| 81980 | LIGHTNING | 1 | SECURITY | 🗑 |
| 81970 | HEAVY RAINS/FLOODS | 5 | CLEAN-UP CREW<br>EMERGENCY RESPONDER<br>MAINTENANCE<br>SECURITY<br>PIPELINE ENGINEER | 🗑 |
| 81960 | EARTH MOVEMENT | 5 | EMERGENCY RESPONDER<br>MAINTENANCE<br>SECURITY<br>PIPELINE ENGINEER<br>CLEAN-UP CREW | 🗑 |
| 81950 | EARTH MOVEMENT | 3 | SECURITY<br>EMERGENCY RESPONDER | 🗑 |
| 81940 | EARTH MOVEMENT | 1 | SECURITY | 🗑 |
| 81930 | FIRE | 5 | PIPELINE ENGINEER<br>MAINTENANCE<br>SECURITY<br>EMERGENCY RESPONDER | 🗑 |
| 81920 | FIRE | 3 | EMERGENCY RESPONDER<br>SECURITY | 🗑 |
| 81910 | FIRE | 1 | EMERGENCY RESPONDER | 🗑 |

BACK

DELIVERY PROFILE

FIELDS MARKED WITH * ARE MANDATORY
CREATE NEW PROFILE OR [COPY EXISTING PROFILE ▼]
                                            ADVANCED SEARCH
PROFILE NAME: [                         ]

BROADCAST RESULTS:

☑ ON-LINE RESULTS:
☐ E-MAIL: [        ]
☐ FAX: [        ]

DELIVERY OPTIONS

| ☑ CONFIRM | • BROADCAST DURATION * | [1] HRS |
| ☐ ESCALATE | • CONTACT CYCLES * | [1] |
| | • INTERVAL BETWEEN DELIVERY METHODS | [0 ▼] MINS |
| | • INTERVAL BETWEEN CYCLES | [00 ▼] MINS |

• VOICE MAIL PREFERENCE: ○ NO MESSAGE    ◉ MESSAGE ONLY    ○ MESSAGE WITH CONFIRMATION INFO
• SEND ATTACHMENT(S) TO: [E-MAIL AND FAX ▼]

DELIVERY METHODS

| ☑ 1 MOBILE PHONE | ☑ 9 ONE WAY SMS | ☑ 17 TAP PAGER |
| ☑ 2 E-MAIL ADDRESS | ☑ 10 SMS | |
| ☑ 3 BUSINESS PHONE | ☑ 11 IM | |
| ☑ 4 FAX | ☑ 12 TTY/TDD | |
| ☑ 5 PAGER | ☑ 13 TEXT DEVICE LMTD | |
| ☑ 6 INTERNATIONAL PHONE | ☑ 14 CALL BACK | |
| ☑ 7 ONE WAY PAGER LMTD | ☑ 15 TEXT DEVICE UNLTD | |
| ☑ 8 ONE WAY PAGER UNLTD | ☑ 16 RADIO PHONE | |

[BACK]  [SAVE]

⊕ NEW MESSAGE TEMPLATE

NOTIFICATION TYPE: ALL ▼    TEMPLATE TITLE: [ ]    TEMPLATE ID: [ ]

LAST UPDATE BY/DATE

FIRST NAME: [ ]    LAST NAME: [ ]    LAST UPDATE: [ ]

SEARCH

SEARCH RESULTS

1 ITEM FOUND.

| TEMPLATE TITLE | TEMPLATE ID | NOTIFICATION TYPE | UPDATED BY | LAST UPDATE DATE | REMOVE |
|---|---|---|---|---|---|
| ALERT: #INCIDENT TYPE# | 34510 | STANDARD | ELIZABETH BOND | 08/03/2009 01:23:35 PM | 🗑 |

BACK

FIG. 12B

MESSAGE TEMPLATE

CREATE NEW TEMPLATE OR [COPY EXISTING TEMPLATE ▼]   *ADVANCED SEARCH*

FIELDS MARKED WITH * ARE MANDATORY

NOTIFICATION TYPE: [STANDARD ▼]   LANGUAGE: [ENGLISH(US) ▼]

☑ USE MESSAGE VARIABLES: [SEVERITY ▼] [INSERT]

TITLE:* [THIS IS AN EXAMPLE #INCIDENT TYPE#]

MESSAGE:* [SEVERITY IS #SEVERITY#]

[2478] CHARACTERS REMAINING

FILE ATTACHMENT

FILE 1: [_____] [BROWSE...]

ATTACH MORE FILES (YOU MAY ATTACH UP TO FIVE FILES. EACH FILE MUST BE 2MB OR LESS AND THE TOTAL ATTACHMENT SIZE MUST BE 5 MB OR LESS.)

[BACK] [SAVE]

INCIDENT COMMUNICATION SYSTEM

BACKGROUND

This specification relates to systems for managing execution of incident response plans.

An incident communication system can serve as the central notification center for operations-related emergencies and for routine communications. Control centers associated with enterprises can have well documented response plans and procedures in place to handle daily or routine to emergency business interruptions, referred to as incidents. To implement such plans, operators of the control centers typically have to execute the plans manually, usually by looking up notification plans (e.g., whom to contact, under what circumstances, and which channels of communication to be used) in safety manuals and bookbinders. Before beginning a call sequence, to be initiated during a specific incident, operators first locate information identifying which responder should receive the message and what the message to that responder should say. Once the responders have been notified and dispatched to the incident location using the above process, the operator can focus on coordinating resolution of the incident.

SUMMARY

This specification describes systems and processes relating to communicating incident notifications. The systems and processes disclosed here automatically generate and send notifications relating to an incident in accordance with an enterprise's business rules and provide real time reporting of all communications relating to the incident.

In general, one aspect of the subject matter described in this specification can be implemented in methods that include the actions of receiving information about an incident affecting operations of an enterprise. The received information includes at least an incident type, an incident location and an incident severity. A data repository associated with the enterprise can be accessed next. The data repository stores data including a plurality of responder profiles corresponding to a plurality of responders, a plurality of message templates for generating incident notifications, and a plurality of delivery profiles for sending incident notifications. Each of the plurality of responders has a contractual arrangement with the enterprise. Each of the plurality of responder profiles includes an associated role and a location at which to perform the associated role. And, a responder role includes an incident-related responsibility. Based on the incident type and the incident severity, a profile of a responder to be notified about the incident can be identified from among the plurality of responder profiles. Responsive to the identified responder profile and the incident location, one or more of the plurality of responders can be selected. Based on the received information about the incident, a message template from among the plurality of message templates and a delivery profile from among the plurality of delivery profiles can be selected. In accordance to the selected delivery profile, an incident notification can be sent to the identified one or more responders. The incident notification is sent to each of the identified one or more responders including an identical message generated based on the selected message template.

The method further includes iteratively receiving additional information about the incident from responders among recipients of the incident notification. For each iteration, an incident status and the received information about the incident can be updated based on the received additional information. Based on the updated information about the incident and the updated status, another message template and another delivery profile can be selected. The method also includes sending to the identified one or more responders, in accordance to the selected other delivery profile, the updated incident status and a corresponding message generated based on the selected other message template.

For each iteration described above, when the received additional information about the incident includes either an updated incident type or an updated incident severity, the method further includes identifying, based on the updated incident type and the update incident severity, a profile of another responder to be notified about the incident. Responsive to the identified another responder profile and the incident location, additional one or more of the plurality of responders can be selected. In accordance to the selected other delivery profile, the updated incident status and the corresponding message generated can be sent to the selected additional one or more responders, based on the selected other message template.

When the received additional information about the incident includes an indication of the incident having been solved, the method further includes closing the incident and updating the incident status to correspond to the closure. And sending, at least to the identified one or more responders, an incident resolution notification. The incident resolution notification can also be sent to a resource responsible for originally identifying the incident. The incident notification to the identified one or more responders can be sent simultaneously to each of the identified one or more responders. Each of the plurality of delivery profiles includes predetermined contact paths including one or more of cell phone, email, work phone, home phone, pager, text messaging, and fax, and a predetermined number of contact attempts associated with each of the predetermined contact paths. For each of the identified one or more responders, the selected delivery profile can specify repeatedly sending the incident notification via one or more contact paths. Responsive to receiving indication of an incident notification delivery attempt to the responder, an associated status of the delivery attempt, an associated delivery attempt count, and an associated delivery attempt time can be recorded. Responsive to receiving confirmation of an incident notification receipt from the responder, an associated delivery status, and an associated delivery confirmation time can be recorded.

An incident notification log can be provided in real time including the incident status, and for each of the identified one or more responders, at least the associated delivery status, the associated delivery count and a message included in the incident notification. When the confirmation of the incident notification receipt includes a type of response to the incident, the method includes displaying in real time an incident notification report including the incident status and the received confirmations summarized by the type of response to the incident. In response to receiving confirmations of incident notification receipt from two or more responders, a conference bridge can be established among the two or more responders to enable information exchange.

Optionally, the method includes displaying the incident notification prior to sending. Further, the method includes receiving edits to the selected message template prior to sending. The method can additionally include receiving edits to a list of recipients including the identified one or more responders, such as adding a responder to the list of recipients, and removing a responder from the list of recipients. Also, an original caller of the incident can be added to the list or recipients. The elected delivery profile can also be edited.

In another aspect, the described subject matter can also be implemented in a system including a user device to enter information describing an incident, a storage device to store information provided by an enterprise, and one or more computer systems operable to interact with the user device and with the storage device. The one or more computer systems can be configured receive information about an incident affecting operations of the enterprise. The received information includes at least an incident type, an incident location and an incident severity. The one or more computers can generate, based on mapping the received information about the incident to the information provided by the enterprise, an incident notification including a message and a notification delivery profile. Further, the one or more computers can select one or more responders based on the generated mapping, and can send the generated incident notification to the selected responders. The one or more computer systems can include a server operable to interact with the device through a data communication network, and the device is operable to interact with the server as a client. The device can be a personal computer running a web browser. Alternatively, the one or more computer systems can be one computer, the device is a user interface device, and the one computer comprises the user interface device.

Particular implementations of the subject matter described in this specification can be implemented to realize one or more of the following advantages. The systems and processes disclosed here provide efficient and consistent resource allocation during incident communications. The foregoing advantages can be accomplished by automatically generating incident notifications that are template-driven thereby reducing messages errors. In addition, an incident communication system can be configured to enable a control center operator to use a software graphical user interface (GUI) to select reported incident type, severity, and location from a drop-down menu, thereby improving the speed and ease of interaction. Further, these advantages can be obtained by automatically sending appropriate predetermined information to a pre-defined list of responders, thereby eliminating the need for human coordinators to perform real-time actions such as composing messages and determining who should receive them.

The systems and processes described in this specification provide fast and versatile incident notification delivery during incident communications. The foregoing benefits can be accomplished by having the notification system contact appropriate team members simultaneously. Further, messages can be sent via multiple contact paths—e.g., cell phone, text messaging, office line, home line, pager, and more—to ensure team members are reached swiftly regardless of location or device type.

The systems and processes disclosed here can enable incident notification effectiveness. For example, the message templates are pre-built, and the system can be configured to contact team members with the same message to avoid inconsistent messages. Further, resource mapping can automate an enterprise's pre-defined decision process.

The systems and processes described in this specification can offer reporting and compliance capabilities. The status and report on the results of every notification sent can be displayed to a human operator. Real-time reporting can provide the detail required for quick, informed decision-making regarding incident resolution. Audit trail of action, status, and resolution for every incident can provide information for trend analysis and satisfies compliance requirements.

The systems and processes described here can scale with the size and scope of the enterprise. For example, the system disclosed in this specification can be implemented to act as central notification center for operations-related emergency and routine communications. The platform and infrastructure can enable usage to scale based on communication requirements. Further, the system can be customized to an enterprise's existing response procedure per any given incident. The disclosed incident communication system can be configured to match incident notifications and responders based on pre-defined criteria, including incident type, location, severity, or other organization specific parameters. Therefore, an enterprise's current response processes can be easily adopted.

Another potential advantage of implementations of the systems and processes disclosed in this specification is that they can be implemented to reduce incident response time. The foregoing advantage can be accomplished by automating communications to respond swiftly and accurately to incidents. Customer-defined messaging and responders can be mapped per incident type, location, and severity at time of implementation. Response resources can be efficiently managed by allocating the right response team in real-time based on incident type, severity level, and location—automatically (that is, by using a computer system that receives input from a human operator, and potentially from other sources, and then, potentially without further human input, applies pre-defined rules to identify appropriate responders and appropriate messages to be communicated to those responders, and then dispatches those messages).

The disclosed systems and processes can offer increased protection from multiple perspectives: in terms of business continuity, communication mistakes that endanger lives can be minimized or prevented. Critical information regarding incident status, facility availability, and changes to standard operating procedures can be disseminated with increased accuracy and reliability.

In terms of critical operations, response staff can be mobilized rapidly. Continuous coordination with other groups as needed through escalations, both internal and external can be provided. An ongoing incident resolution status can be reported to key managers.

In terms of safety, accurate information about the incident can be swiftly disseminated to field service personnel and by prompting them to respond through two-way communications. The ability of the control center to automate message creation and notification delivery can save time and can increase safety.

In terms of infrastructure resilience, communication failure points can be eliminated through multipronged communication infrastructure and multiple points of broadcast initiation.

In terms of accountability, real-time reporting for all pipeline operation-related communications can be provided. For example the systems described here can be configured identify who was notified with what message, on what device, and when—and whether or not they confirmed receipt, to obtain clear visibility and audit history results for every notification sent.

Further, the systems and processes disclosed in this specification enable to bring recovery efforts to an orderly close by sending out a resolution message (e.g., "all clear") and closing out an incident response.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 5B-G show screen shots illustrating aspects of the example implementation of the process for sending an incident notification.

FIGS. 6B-C show screen shots illustrating aspects of the other example implementation of the process for sending an incident notification.

FIGS. 7-13 show screen shots illustrating aspects relating to the administration of an example incident communication system.

Like reference numbers and designations in the various drawings indicate like elements.

DETAILED DESCRIPTION

This specification describes systems and processes relating to communicating incident notifications. The systems and processes disclosed here automatically generate and send notifications relating to an incident in accordance with an enterprise's processes per incident and provide real time reporting of all communications relating to the incident.

Figure 1:
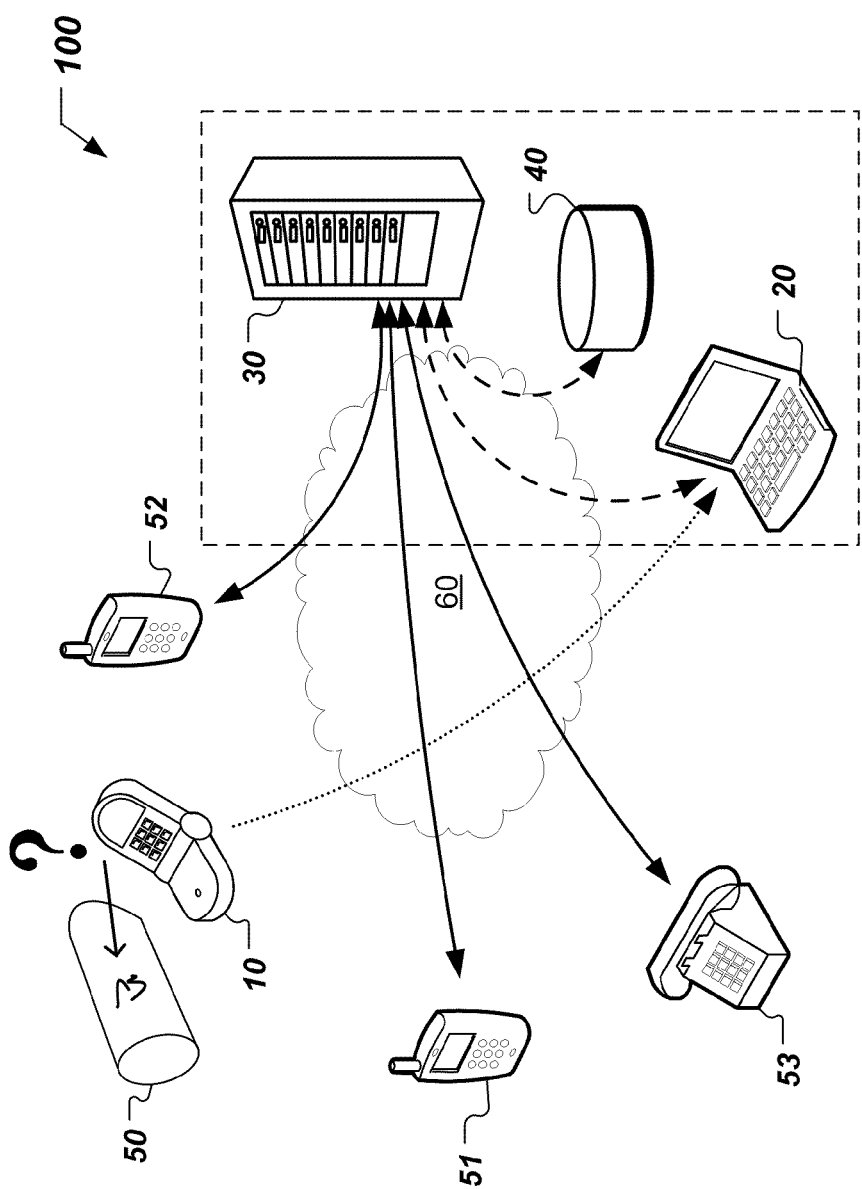
FIG. 1 shows a block diagram of an example incident communication system 100.

FIG. 1 shows a block diagram of an example incident communication system 100. A representation of system 100 is included in a dashed-line rectangle. The incident communication system 100 can include a computing device 20 located at a control center of an enterprise. An enterprise can include a company, an educational institution, or an organization. The computing device 20 may be operated by a user manning the control center. The incident communication system 100 also includes a server computer 30 in communication with the computing device 20. The server computer 30 is configured to run a software application for providing incident notifications. The incident communication system 100 must also include a storage device 40 in communication with the server computer 30. The storage device 40 can store information associated with the enterprise and can communicate with the server computer 30 via a communication network 60. The communication between the computing device 20 and the server computer 30 can also be carried via the communication network 60. The communication channels within the incident communication system 100 are represented in FIG. 1 by dashed-line arrows.

In an example incident situation, a user of the control center can be in communication over the phone (represented in FIG. 1 by a dotted-line arrow) with a caller 10 about an area of the enterprise's pipeline 50 that has been struck by a mechanical object. A label on the pipe 50 listing a call number of the control center has prompted the passerby caller 10 to call the control center to report this incident.

A graphical user interface (GUI), available on the computing device 10, can be configured to receive the control center user's information about the incident. For example, the control center user can enter, into the GUI of the incident communication system, information including the caller's location, contact data, and pertinent details about the incident. The user can select the incident type, severity level, and location from the GUI. The system 100 automatically generates a message, and distributes the generated message to a pre-defined list of response team members associated with the enterprise. The association between the responders and the enterprise may be based on a contractual agreement. For example, the responders can be employed by the enterprise or may be contractors working under contract for the enterprise.

Response team members are notified via phone, pager, email, text messaging, fax, and more. FIG. 1 illustrates representations of two responders 51 and 52 contacted by cell phone, and a responder 53 contacted by landline (represented in FIG. 1 by full-line arrows). The system 100 can continue to cycle through all contact paths until the team members confirm receipt of the notification. The layout of FIG. 1 does not provide time information, i.e., one cannot tell from FIG. 1 whether the responders 51-53 have been notified at the same time (say, in a same notification cycle) or whether the responders have been notified in successive notification cycles. The diagram of FIG. 2 includes time information for the processes implemented in system 100.

Figure 2:
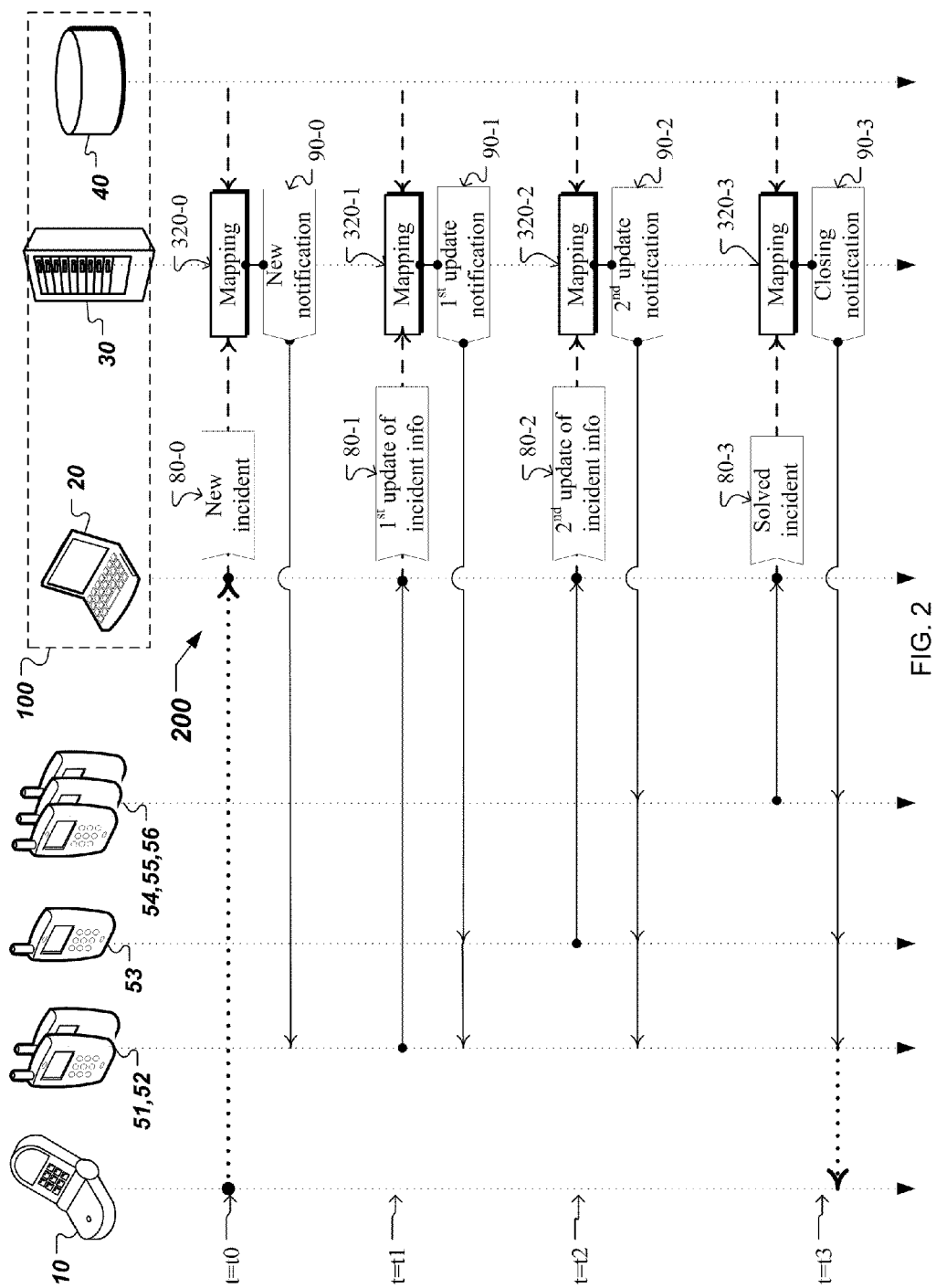
FIG. 2 shows a swim-lane diagram 200 of an example process for delivering incident notifications implemented in the example incident communication system.

FIG. 2 shows a swim-lane diagram of an example process for delivering incident notifications 200 implemented in the example incident communication system 100. The swim-lane diagram in FIG. 2 shows the process for delivering incident notifications 200 as a time sequence from t=t0 (at the top of the swim-lane diagram) to a later time t=t3 (at the bottom of the swim-lane diagram). The first or left-most (vertical) lane signifies the time sequence corresponding to the caller 10 who called in to report the damage to pipeline 50. The second through the fourth lanes represent time sequences, respectively, for groups of responders grouped by notification cycle associated with the current incident, as described below. The fifth lane depicts the time sequence of the computing device 20. The sixth lane depicts the time sequence of the server computer 30. Finally, the sixth (right-most) lane corresponds to the storage device 40.

For example, the incident notification associated with an initial time, t=t0, can represent the example incident situation described in reference with FIG. 1. The system 100 is unaware of the incident (damaged pipeline) prior to t0. Thus at t=t0, server 30 receives information about a new incident 80-0, including the type, location and severity of the incident. Each index following a numerical reference of the swim-lane diagram refers to an associated time index. For example, information about the incident received at t0, t1, ... is referenced by 80-0, 80-1, ..., respectively. In response to receiving information about the incident 80-0, the server 30 automatically generates an incident notification 90-0. To generate incident notification 90-0, the server matches 320-0 the received information about the incident 80-0 with information regarding enterprise's rules for managing incident resolution, including sending incident notifications that is stored by system 100 on storage device 40. Such matching, or incident-to-notification mapping is described in detail in FIGS. 3-4. The mapping includes identifying responder skills for resolving the incident, selecting the responders available at the incident location who have the identified skills, selecting a notification delivery path, and selecting an informative message.

The server computer 30 is configured to map 320-0 the received information about the incident 80-0 to the generated (or mapped) incident notification 90-0. In the example situation described in FIG. 2, responders 51 and 52 are selected by system 100 through the mapping process 320-0 to receive the incident notification 90-0. In this instance, the responders 51 and 52 may be pipeline technicians. The responders 51 and 52 (may confirm receipt of the notification 90-0, and) arrive at the incident site. Once at the incident site, responders 51, 52 can relay pertinent information to management via an instant conference bridge established by the incident communication system 100 (not shown in the swim-lane diagram). In this case, responders 51 and 52 and management decide that there is need for an accurate diagnostic of the pipeline damage and that another notification may be required.

At t=t1, the control center user enters to the computing device 10 a higher severity level for the incident. The server 30 receives updated information about the incident 80-1, including the higher severity level for the incident, and including a status update. Server 30 maps 320-1 the updated information about the incident 80-1 to another generated (mapped) incident notification 90-1 to be sent to the original responders 51, 52, and (in this case) to an additional responder 53. For example, responder 53 may be a pipeline engineer. The incident notification 90-1 is a first update incident notification, as opposed to the original incident notification 90-0 that was a new incident notification.

The responders 51, 52 and 53 (may confirm receipt of the notification 90-1, and) meet at the incident site. When noticing that the pipeline leaks from the damaged area, responders 51, 52 and 53 can decide to further escalate the severity level of the incident and to replace the damaged portion of the pipeline.

At t=t2, based on information received from the responders 51, 52 and 53 in the field, the control center user enters to the computing device 10 a new incident type and higher severity level for the incident. The server 30 receives the updated information about the incident 80-2, including the higher severity level for the incident, and including the status update. Server 30 maps 320-2 the updated information 80-2 to another generated (mapped) incident notification 90-2 to be sent to the previous responders 51, 52, 53 and to additional responders 54, 55 and 56. For example, responder 54, 55, 56 may be pipeline welders. The incident notification 90-2 is a second update incident notification.

The responders 51-56 (may confirm receipt of the notification 90-2, and) meet at the incident site. There, the responders 51-56 successfully replace the damaged portion of the pipeline 50 to solve the incident.

At t=t3, the control center user enters to the computing device 10 information relating to the completion of the incident. The server 30 receives the incident completion information 80-3, and the status update. Server 30 maps 320-3 the updated information 80-3 to the generated (mapped) closing incident notification 90-3 to be sent to the all responders involved in the incident 51-56, and to everyone else who may need to know. Optionally, the caller 10 who called in the original incident may be notified of the incident resolution.

In addition, the incident communication system 100 logs and time-stamps all notes, journal entries and communications (notification attempts, methods, and acknowledgements) from the initial call, at t0, to incident resolution, at t3, for reporting and analysis.

Figure 3:
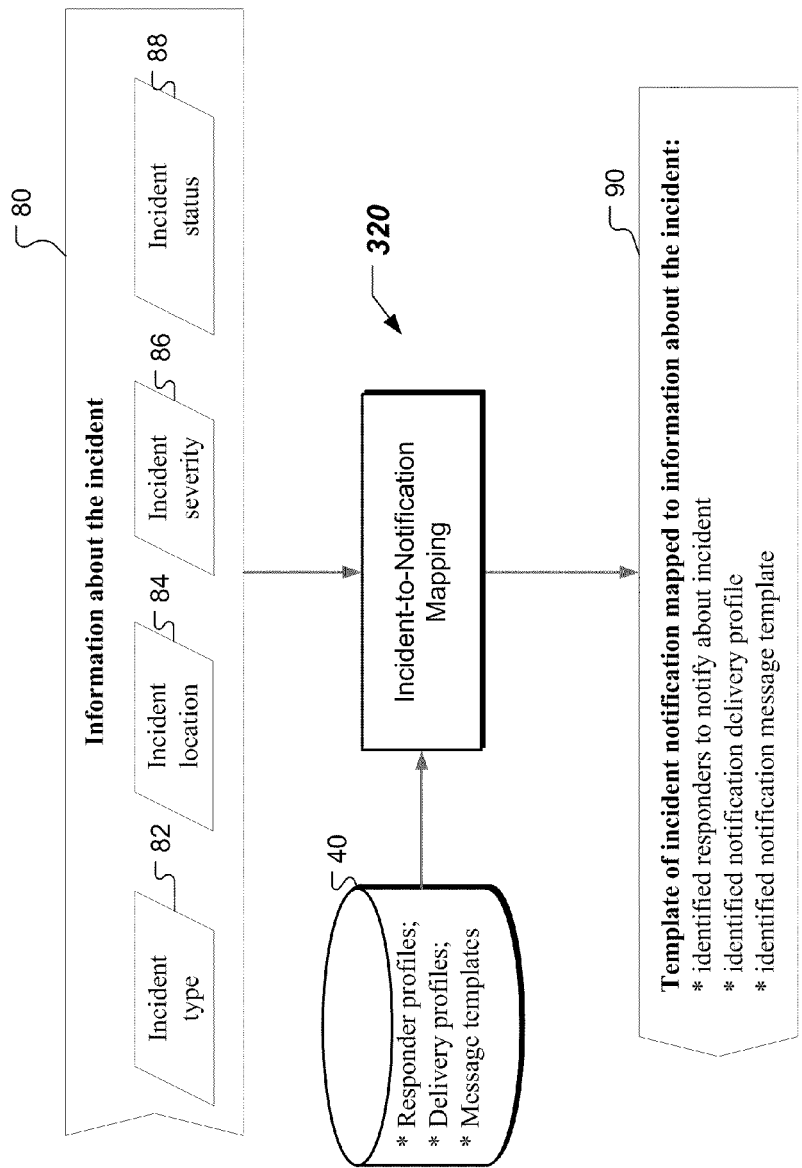
FIG. 3 shows a transfer-function diagram of an example incident-to-notification mapping process.

FIG. 3 shows a transfer-function diagram of an example incident-to-notification mapping process 320. The process is based on matching the received information about the incident 80 to information provided by the enterprise and stored in storage device 40, to generate an incident notification 90 including a message and a notification delivery profile. Further, the matching process 320 selects responders to receive the mapped incident notification 90.

A first input-information to the mapping process 320 is information about the incident 80. In this specification, an incident is an effect that can affect operations of an enterprise. The received information about the incident 80 includes at least an incident type 82, an incident location 84, and an incident severity 86.

The values of the incident type can be defined by the user (enterprise, etc.) and depend on the nature of the enterprise. For example, for a chemical factory, example incident types are fire, spill/release, odor, temperature, heavy winds, etc. An enterprise can define incident types that may be used in notifications and mappings.

The values of the incident location are also defined by the user (enterprise, etc.) and depend on the layout, configuration, and structure of the enterprise's assets. For example, for a multi-campus university, locations can be defined (coarsely) at campus-level: Los Angeles, San Diego, Irvine, Riverside, etc. Within each campus, locations can be refined to buildings, or even floors.

The values of incident severity are intended to classify a type of incident. For example, if the incident type is spill, the severity can range from traces of liquid on the floor (corresponding to low severity, or level 1 severity) to puddles on the floor exceeding a predetermined area (corresponding to high severity, or level 5 severity).

The information about the incident 80 also includes an incident status, which can be new, update, final (closing) and follow-up. A new incident notification and a final incident notification can each be generated only once for a given incident, respectively, at the opening of the incident (t0), and at the completion of the incident (t3). The update incident notifications can be generated upon receiving incident information updates from the responders at the incident site. There can be as many update incident notifications as necessary, between the opening and the closing of an incident.

A second input-information to the mapping process 320 includes information that is stored by system 100 on storage device 40 regarding enterprise's rules for managing incident resolution including sending incident notifications. Among other things, the information stored in storage device 40 includes responder profiles. Examples of responder profiles are pipeline engineer, plumber, cleaning crew, security guard, etc. The information stored in device 40 also includes personal profiles of the responders. A responder's personal profile includes the responder's skills and responsibilities, the responder's location, the responder's contact paths, etc. Further, the information stored in device 40 includes delivery profiles for the incident notification. A delivery profile has predetermined contact paths including one or more of cell phone, email, work phone, home phone, pager, text messaging, and fax. The deliver profile also includes a predetermined number of contact attempts associated with each of the predetermined contact paths. Additionally, the information stored in device 40 includes notification message templates. The message templates are targeted for a specific incident type, severity and location.

The output information of process 320 includes an incident notification template 90 that is mapped to the received information about the incident 80. The incident notification template 90 includes a mapped notification message template, a mapped notification delivery profile and identified responders to notify about the incident. A control center user can send the incident notification template 90 as the incident notification, as is, without modifications. However, the incident notification template 90 can be modified prior to sending the notification. For example, a user can edit either of the notification message or the delivery profile. Also, a user can add or remove responders.

Figure 4:
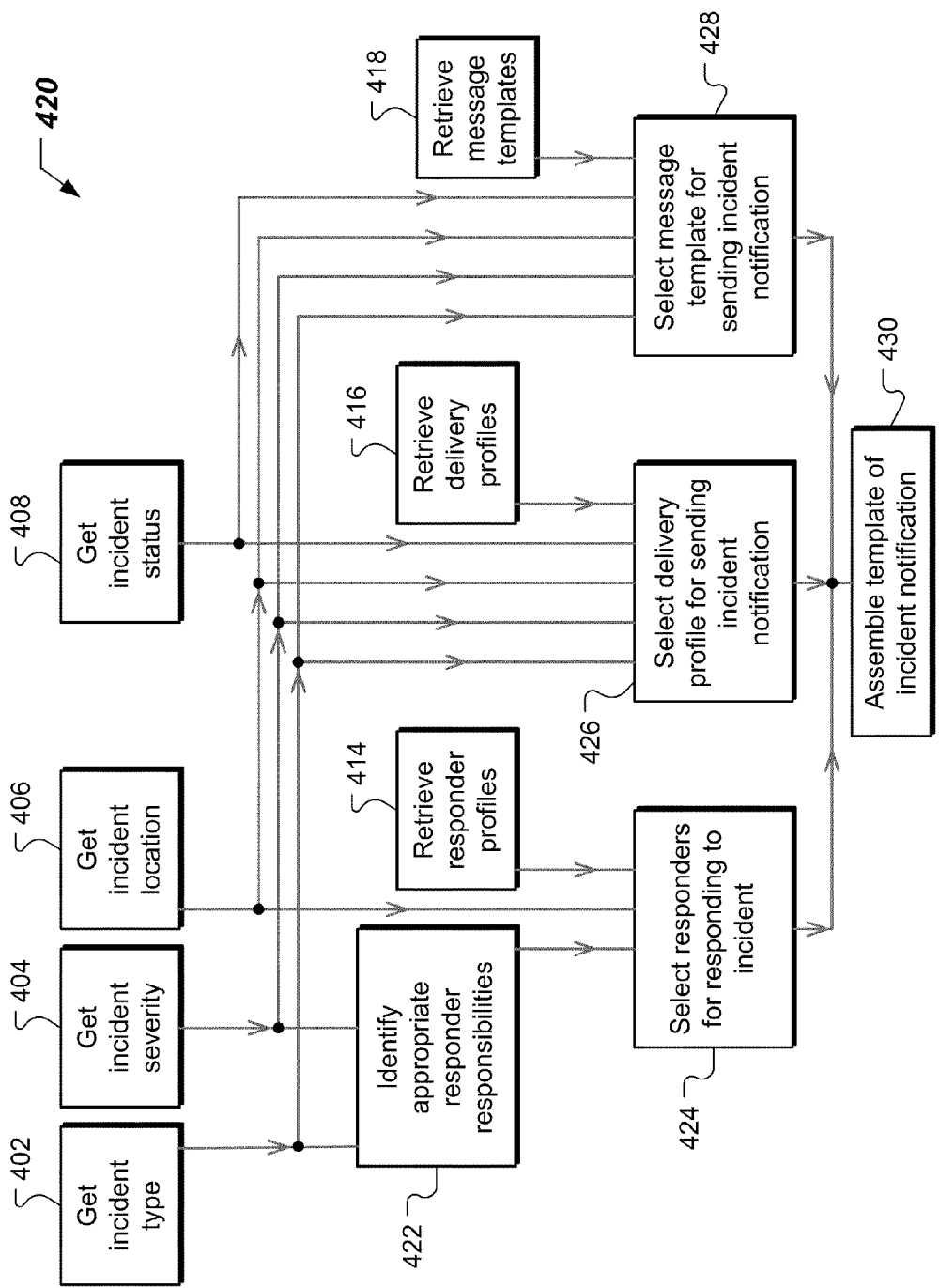
FIG. 4 shows a flow chart 420 of an example implementation of the incident-to-notification mapping process.

FIG. 4 shows a flow chart of an example implementation of the incident-to-notification mapping process 420. The mapping process 420 can be implemented as process 320 in FIGS. 2-3. The process 420 includes getting from computing device 20 the received information about an incident affecting operations of an enterprise. Specifically, the process 420 gets an incident type 402. Also, the process 420 gets an incident severity 404. Further, the process 420 gets an incident location 406. The process 420 also gets an incident status 408.

The process 420 identifies 422, based on the incident type and the incident severity, a profile of a responder to be notified about the incident. The process 420 retrieves from the data repository a plurality of responder profiles corresponding to a plurality of responders 414. Each of the plurality of responder profiles includes an associated role and a location at which to perform the associated role. The responder role can include an incident related responsibility. Responsive to the identified responder profile and the incident location, the process 420 selects one or more of the plurality of responders 424. In some implementations, the process 420 can select a responder profile based on incident type, incident severity, incident location AND shift schedule, on-call schedule or union roster.

The process 420 retrieves from the data repository a plurality of delivery profiles for sending incident notifications 416. The process 420 further selects a delivery profile from among the plurality of delivery profiles 426.

The process 420 retrieves from the data repository a plurality of message templates for generating incident notifications 418. In addition, the process 420 selects, based on the received incident type, severity, location and status, a message template from among the plurality of message templates 428.

In other implementations, process 420 can select 424, 426 and 428 responder profiles, delivery profiles, and message templates, respectively, based on one or more criteria in addition to incident type, incident severity and incident location and/or including sub-type, sub-severity and sub-location. Such additional criteria can be enterprise-specific. For example, for incidents related to school-campus operations, an additional criterion may be whether school is in session or not.

Finally, the process 420 assembles 430 the incident notification template from the selected message template, the selected delivery profile and the selected one or more of the plurality of responders.

Figure 5A:
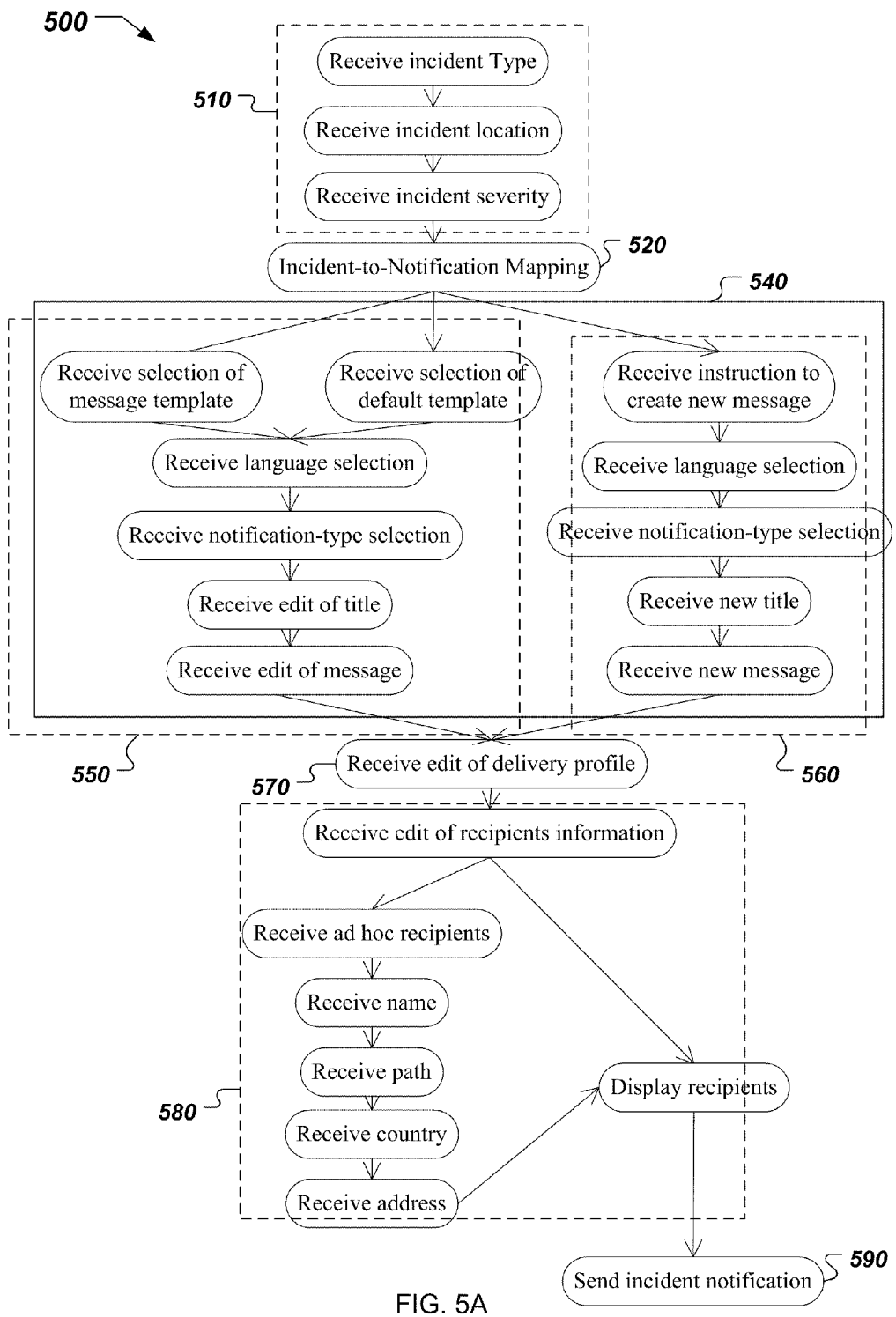
FIG. 5A shows a flow chart 500 of an example implementation of a process for sending an incident notification.
Figure 5B:
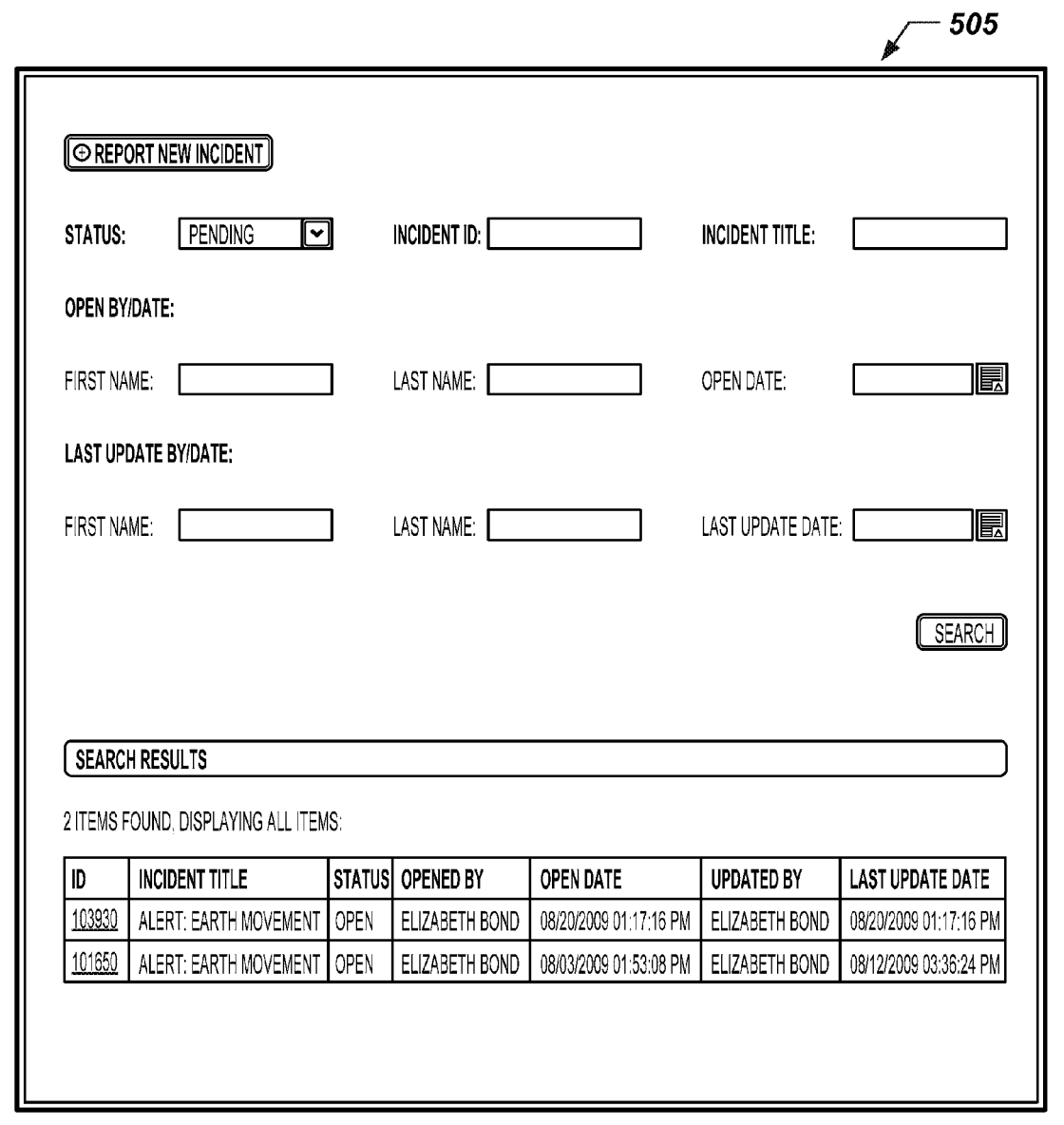

FIG. 5A shows a flow chart of an example implementation of a process 500 for sending an incident notification. Operations that are part of process 500 are illustrated in the screenshots of FIGS. 5B-5G. For example, FIG. 5B shows the Notification Landing Page presented to a control center user. The user can select the Notify tab to send an incident notification. The Notify tab 505 contains a Report New Incident Button to send a new incident notification. The Notify tab 505 also contains a Search Section to find current active incidents, and a Search Results Section to display the results of a search.

Figure 5C:

Process 500 can start by receiving information about the incident from a user 510. FIG. 5C shows the Enter Incident Details functionality of the Report New Incident/Update Incident/Final Incident Notification Page 510. This functionality is used to enter the incident type, location and severity level as well as additional information identified on the page 510. The interface allows a user to select multiple incident types and/or multiple locations per incident.

In other implementations, a business rules engine can dynamically determine the appropriate available initial inputs or subsequent available inputs based on information known about the user or selected by the user. In some instances when a large list of locations may include, for example, 200 locations, the business rules engine can be configured to display to a call center operator only a subset of locations from among the 200 locations. In other instances, the business rules engine can be configured to filter certain additional information fields and values that can be selected based on the category selected for an Incident. More specifically, the operator may select "Medical" as the category and at that point, the a user interface similar to FIG. 5C can display a subcategory of "Medical Type" which includes all of the defined Medical Types, such as "Burn", "Sprain", "Life Threatening", etc. This subcategory is determined by the business rules engine and would not be displayed unless the category of "Medical" is selected.

Returning to FIG. 5C, the user can also enter a broadcast note for the incident. The broadcast note can be used for journaling purpose. For example, the control center user may enter information about the caller: "The caller appears distraught, etc." A broadcast note is not typically broadcast as part of the associated notification. Additionally, if the "Requires Follow Up" flag is checked during an incident, the control center user may have to send a Follow Up notification after the Final status notification has been sent in order to close the incident. The screenshot 510 of FIG. 5C shows the step of receiving information about the incident for a new incident 510. However, at step 510, the process 500 can receive updates about the incident type, location, and severity, to generate an update notification or a final notification.

Returning to FIG. 5A, the information about the incident can be received 510, in other implementations, automatically from applications that are external to the incident communication system 100, via API. An external application can provide at least an incident type, an incident location and an incident severity. In such implementations, notifications can be sent 590 automatically by the incident communication system 100, without operator intervention. In some other implementations, operators must enter, into the computing device 10 of the incident communication system 100, an instruction to send the notifications after reviewing the triggered "alert" received from the API.

Process 500 continues with incident-to-notification mapping 520 that can be implemented, for example, as addressed in reference to FIG. 4. Process 500 can proceed directly to sending 590 the incident notification generated by the incident-to-notification mapping operation 520. However, optional intermediate operations are available to the control center user providing inputs to process 500.

For example, process 500 can continue with step 550. At step 550, process 500 can receive edits from user device 20 to the mapped incident notification template generated at step 520. Step 550 can be implemented as shown in screenshot 550 of FIG. 5D. For example, FIG. 5D shows the Report New Incident functionality of the Report New Incident/Update Incident/Final Incident Notification Page 550. This functionality is used to report a new incident. The information entered for a new incident includes the message template, the notification type, language, title, a detailed message, an option to attach one or multiple files, choice of a delivery method, the option to edit the responders list, and finally to send a notification.

Figure 5E:
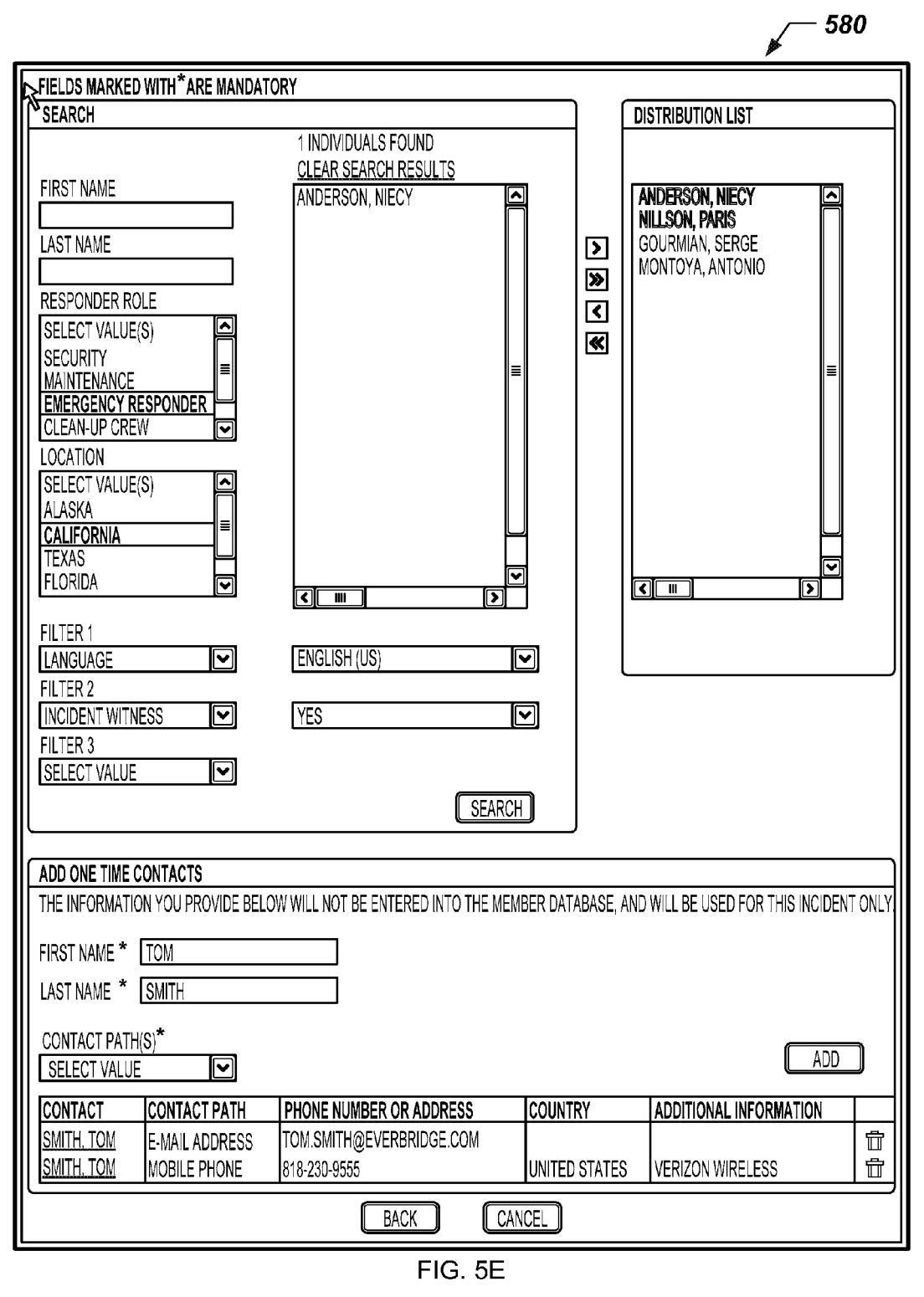

Returning to FIG. 5A, process 500 can include receiving edits to the intended recipients of the incident notification 580. Step 580 can be implemented as shown in screenshot 580 of FIG. 5E. FIG. 5E shows the Edit Responders Page. This page is used to view and modify the list of responders mapped by default to the currently edited incident. The default responders mapping is determined by the incident type, location, and severity level selected in the Incident Details page. The user has the option to search, select/un-select responders from a pre-determined list extracted from the responders group members database, or to enter/edit/delete one-time contacts that are not in the database.

Returning to FIG. 5A, process 500 can further include receiving edits to the intended recipients of the incident notification 570. Step 570 can be implemented as shown in screenshot 570 FIG. 5F shows the Delivery Profile Page. This page allows for defining a delivery profile. The delivery profile definition includes: a profile name, broadcast method choice (e-mail or fax), delivery options (Confirm, Escalate, Broadcast Duration, Number of Cycles, Interval Between Cycles, Interval Between Delivery Methods), voicemail preference (No Message, Message Only, Message With Confirmation Info), attachment(s) delivery preference, and notification delivery methods (choices include: mobile phone, e-mail address, as well as others as shown in FIG. 5F).

Returning to FIG. 5A, process 500 can proceed to sending 590 the incident notification, after having performed one or more of the optional steps 550, 560 and 570.

After process 500 sends 590 the incident notification, responders may reach the incident site and assess the status of the incident. The foregoing responders may provide the calling center with new information about the incident at multiple stages of the incident resolution process. Thus, the system can iteratively receive additional information about the incident from responders that have received the incident notification 510. For each notification cycle, the system updates an incident status and the previously received information about the incident based on the received additional information. The system can then select, based on the updated information about the incident and based on the updated status, another message template and another delivery profile. The system can then send to the identified one or more responders, in accordance to the selected other delivery profile, the updated incident status and a corresponding message generated based on the selected other message template. Note that the other delivery profile can coincide with the previous delivery profile.

In some instances, the additional information about the incident received from the responders solving the incident can include an updated incident type and an updated incident severity. For example, if the incident type that triggered, at t0, the first notification was cracked pipe, and the severity level was low, the responders that arrived at the incident site may assess the incident type need be escalated to leaking pipe, and the severity level be increased to high. Moreover, the responders may find the water from the leaking pipe located on the second floor of Building "A" found its way to the first floor of Building "A".

In such instances, the process can identify, based on the updated incident type and the update incident severity, a profile of another responder to be notified about the incident. In the previous example, a plumber and a cleaning crew. Responsive to the identified another responder profile, or profiles, and the updated incident location, the process can select additional one or more of the plurality of responders. In the above example, in addition to the cleaning crew responsible for the second floor that was notified during previous notifications related to this incident, the system may select to notify the cleaning crew in charge of the first floor. Finally, the system sends to the selected additional one or more responders, in accordance to the selected other delivery profile, the updated incident status and the corresponding message generated based on the selected other message template.

In another example, upon solving the incident, the person coordinating the responders attending to the incident may provide to the command center information about the resolution of the incident. In this example, the system sends an incident resolution notification (also referred to as incident closing notification) to everyone involved with the solved incident and to anyone else who needs to know. For example, the incident resolution notification may be sent to a resource responsible for originally identifying the incident.

Figure 5G:

FIG. 5G shows a screenshot 590 of the Send Update/Final Notification Page. The user has the option to send an incident update, or to send a final notification and to close an incident. The notification status can be provided for selection by the control center user through the drop down menu. The notification status can be new, update, final and follow up. Page 590 offers the option to search for prior broadcasts sent for the currently selected incident. The user can review existing journal entries for the incident, and has the option to enter a new journal entry. The Print Incident Report button can be selected to view all incident notifications to date.

As described above, the incident communication system 100 can treat an incident as a whole event including individual incident notifications as part of the whole event. For instance, an example incident of "Chemical spill in Building 123" may contain an initial notification (NEW), multiple update notifications (UPDATE), an "all clear" notification (FINAL) and a follow up notification (FOLLOW UP). The entire incident contains the individual notifications as well as the Journal entries and Broadcast Notes.

Figure 6A:
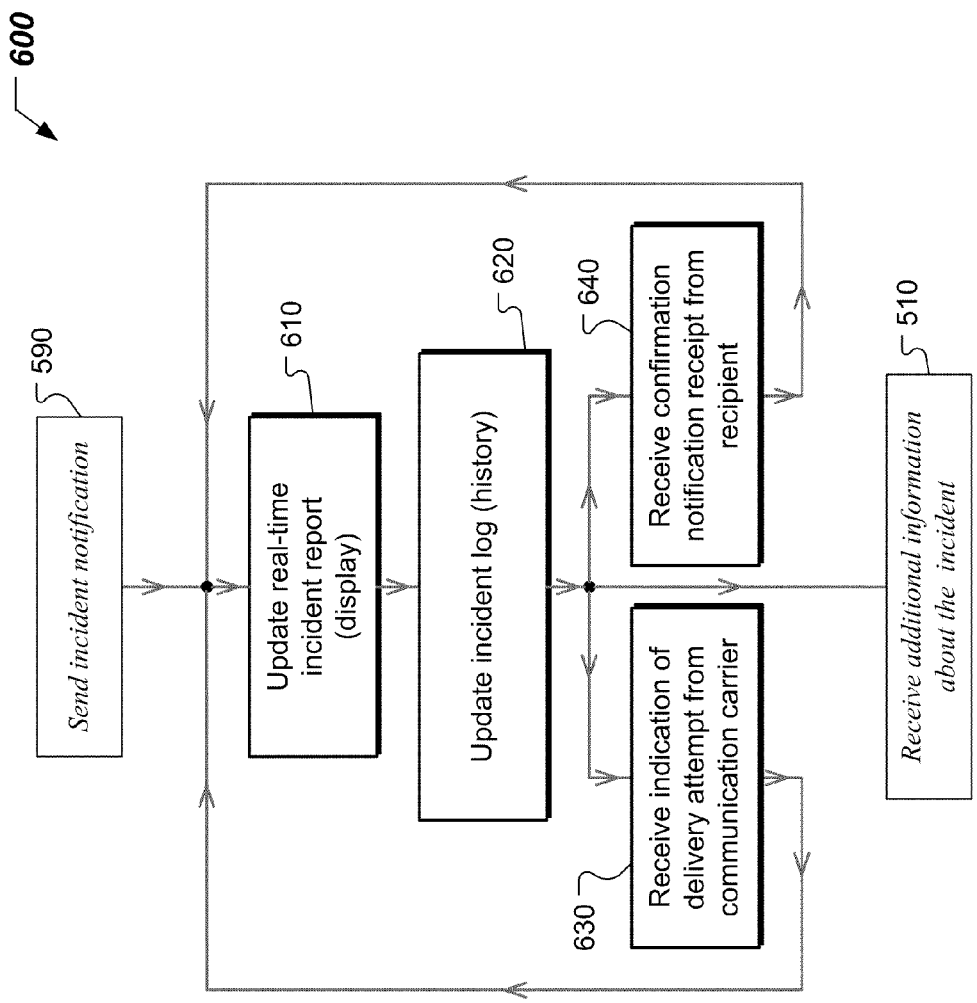
FIG. 6A shows a flow chart 600 of another example implementation of the process for sending an incident notification.

FIG. 6A shows a flow chart of aspects of a process 600 for generating the Journal entries and Broadcast Notes. Process 600 can be implemented as a sub-process, for example, immediately after process 500 illustrated in FIG. 5A.

After sending the incident notification, process 600 can continue by updating a real-time incident report 610. FIG. 6B shows the Broadcast Results Page 610. Page 610 allows the user to review active broadcasts and to monitor confirmations. The real-time report 610 may be refreshed every minute. Returning to FIG. 6A, process 600 continues by updating an incident log used to audit trail of action, status 620. FIG. 6C shows the Incident Report Summary Page 620. On the summary page 620, the user can review the incident and related notification information. The incident report can be a document that shows the chronology of the incident from the initiation of the "NEW" notification through the then current status. The document format of the incident report can be, for example, pdf or a specific format that is required by Federal, State, or other governing regulatory agencies. The incident report can identify the Incident, can show the Journal entries, each related notification (broadcast), its corresponding Broadcast Notes and the information in relating to the Broadcast Notes, as shown in FIG. 6B.

For each of the identified responders, the incident notification is sent 590 in accordance to the selected delivery profile. Therefore, sending 590 includes repeatedly sending the incident notification via one or more contact paths. Responsive to receiving indication of an incident notification delivery attempt to the responder 630, process 600 updates an associated delivery status, an associated delivery attempt, and an associated delivery time in the real-time incident report 610, and in the incident log 620. Responsive to receiving confirmation of an incident notification receipt from the responder 640, process 600 updates 610 and 620, in the real-time incident report, and respectively in the incident log, an associated delivery status, and an associated delivery confirmation time.

After updating 610 and 620 the real-time incident report, and respectively the incident log, the process 600 can return to process 500 upon receiving additional information about the incident 510. Therefore, process 600 can be recursively tied with process 500.

At the incident/event level, the incident communication system 100 can have a Journaling capability so that control center users can log date/time stamped contemporaneous information that is not notification-related for historical, auditing or reporting purposes. For example, such information that is not notification-related may include actions that were taken, decisions that were made, who gave which orders, etc, over the duration of the incident.

At the notification level, the incident communication system 100 can have a Broadcast Notes capability so that control center users can enter information related to the notification, but the entered information is not included in the message template that goes out to recipients (e.g., "Caller sounded distraught").

Figure 7:
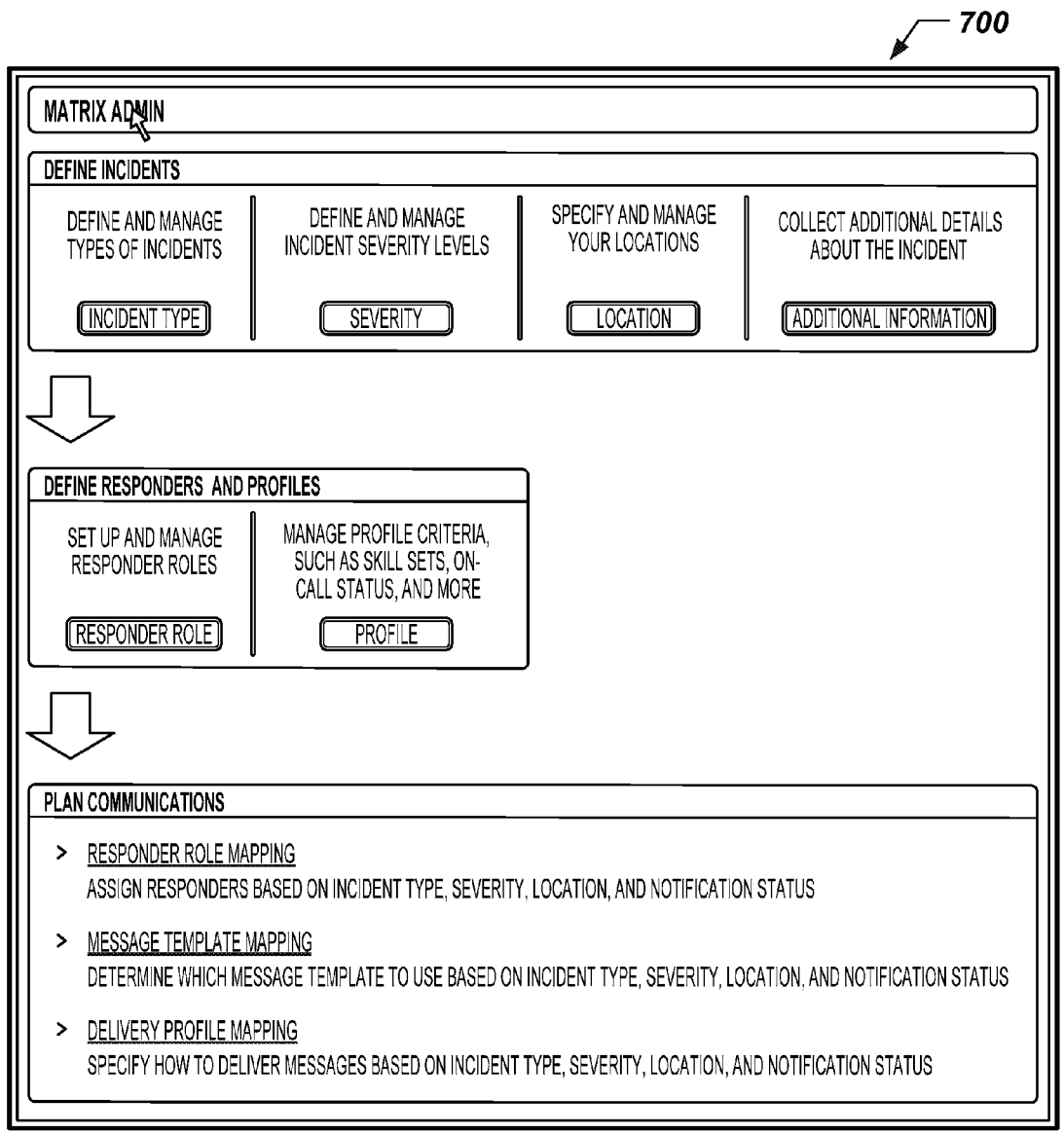

FIG. 7 shows the administration page 700 of the incident communication system 100. This page allows the user to select a button or a link in order to go to a page in the workflow where administration tasks can be performed for the following incident characteristics: Incident Type, Severity, Location, Additional Information, Responder Role, Member Profile, Responder Role Mapping, Message Template Mapping, Delivery Profile Mapping. The incident type, incident severity, incident location and responder role are incident parameters that are used by the mapping process 320. An attribute of a responder's profile can be used for filtering purpose.

Figure 8A:
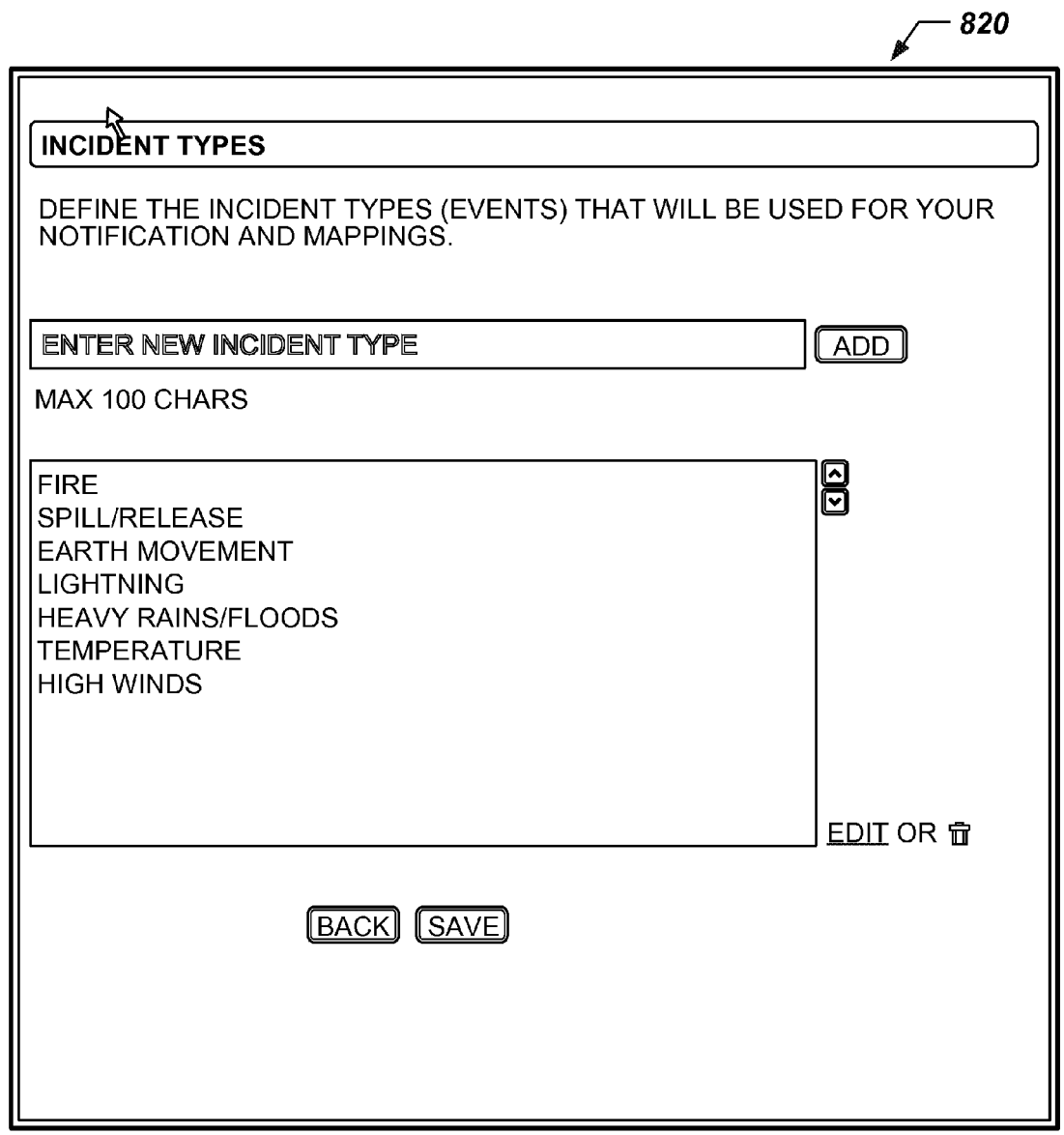

FIG. 8A shows the Incident Types Administration page 820. This page allows the user to perform administration tasks such as: incident type definition, editing or deleting incident types, and reordering of available incident types.

FIG. 8B shows the Severities Administration Page 840. This page allows the user to perform administration tasks, such as add, edit, or delete severity levels to be used in incident notifications. The user can also define the relative order of severity levels. Further the user can determine the order in which severity levels are listed (High to Low or Low to High).

Figure 8C:
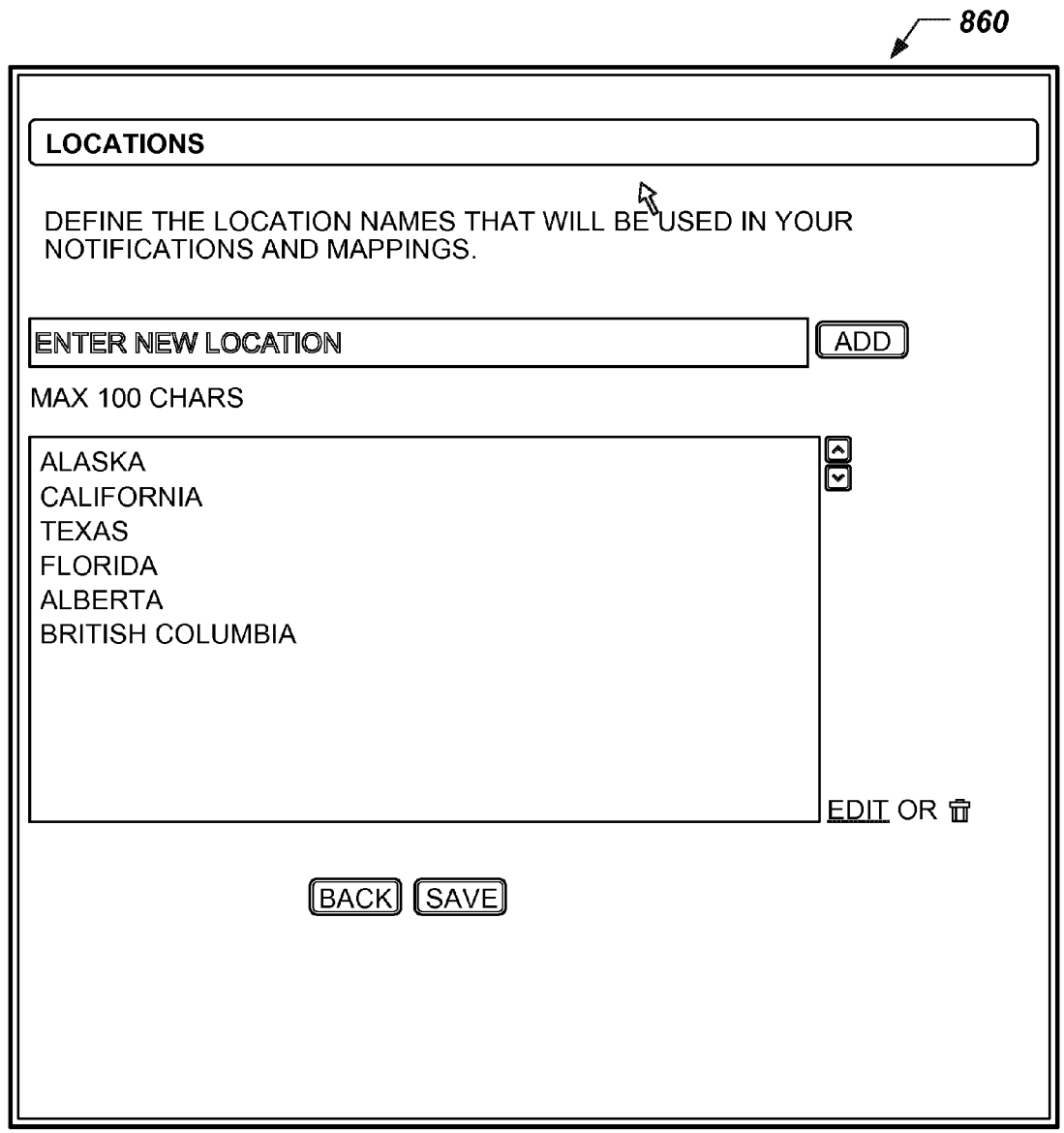

FIG. 8C shows the Locations Administration Page 860. This page allows the user to perform administration tasks such as: add, edit, or delete locations to be used in incident notifications. The user can additionally define the display order of the locations. In other implementations of the incident communication system 100, the location selection page can contain map images of the enterprise's available locations. For example, for a multi-campus university, the text box on page 860 may by replaced or supplemented by the maps of, respectively, the Los Angeles campus, San Diego Campus, Irvine campus, etc.

FIG. 8D shows the Additional Information Administration Page 880. This page allows the user to perform administration tasks, such as add, edit, or delete custom fields used to collect incident information. The user chooses the new field display format, whether the field is optional or mandatory; enters and determines the display order of any predefined values for fields that are presented as drop-down-boxes. The user may choose to add, edit, or delete values to existing fields.

FIG. 9A shows the Responder Roles Administration Page 920. This page allows the user to perform administration tasks, such as add, edit, or delete responder roles to be used in incident notifications. The user can also define the display order of the responder roles.

FIG. 9B shows the Member Profile Attributes Administration Page 940. This page allows the user to perform administration tasks, such as add, edit, or delete member profile attribute types and values. The user has the option to choose the name(s), data type(s), value(s), and display order of the newly added member profile attribute entries.

FIG. 10 shows the Responder Role Mapping Administration Page 1000. The user has the option to add, edit, or delete responder roles to an Incident Type and Incident Severity combination.

Figure 11A:

FIG. 11A shows the Delivery Profile Mapping Administration Page 1120. This page allows the user to perform administration tasks, such as add, edit, or delete delivery profile mappings by selecting a delivery profile to be assigned to a combination of Incident Type, Location, Severity, and Notification Status values.

Figure 11B:
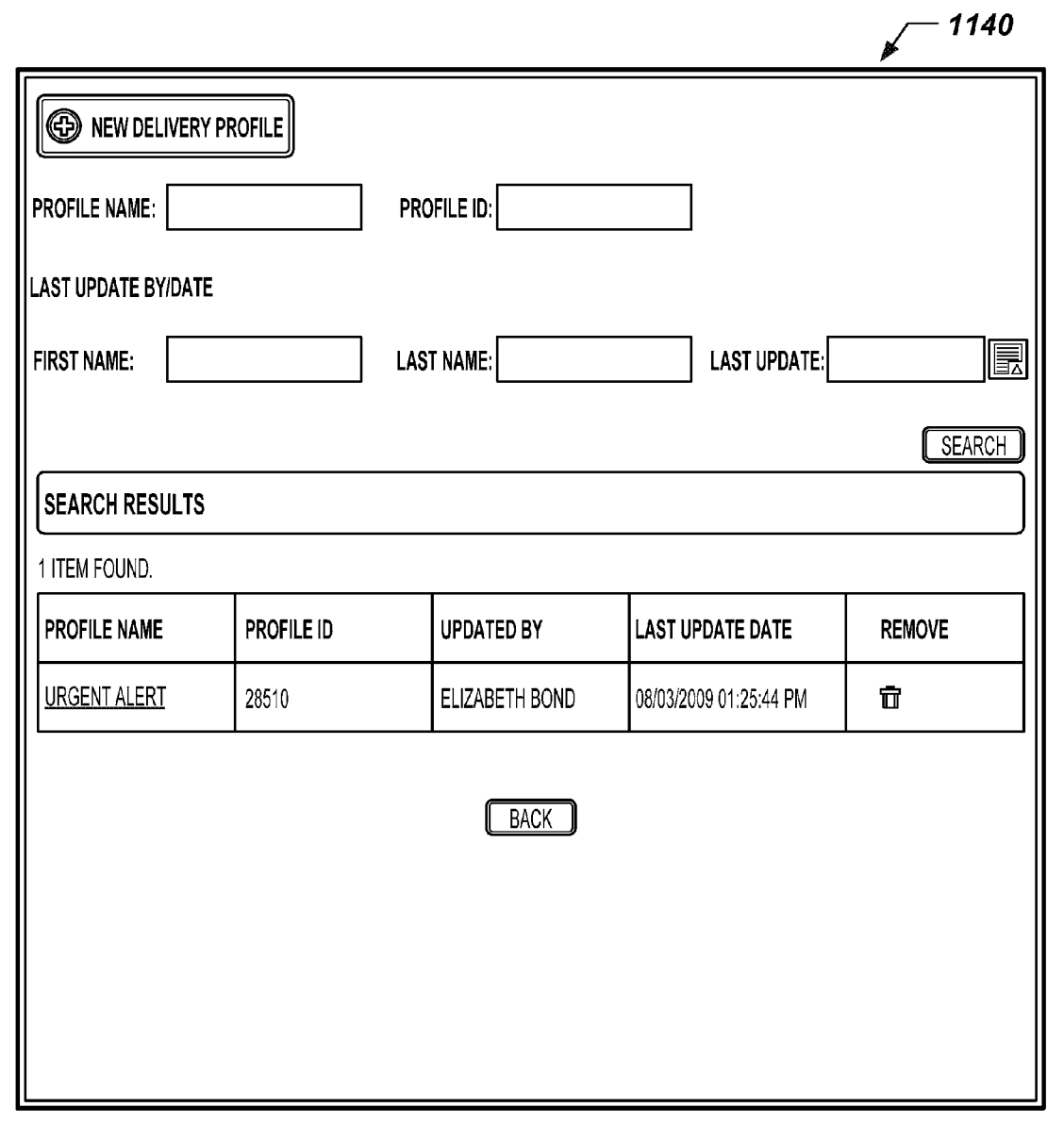

FIG. 11B shows the Delivery Profile List Page 1140. This page allows the user to search and list available delivery profiles. Selecting the New Delivery Profile button redirects the user to the page where the user may enter a new delivery profile.

FIG. 11C shows the Delivery Profile Page 1160. This page allows the user to define a new delivery profile. The user may enter the values that define the new delivery profile, or may start by copying an existing delivery profile. The following delivery profile characteristics are specified as shown on page 1160: name, broadcast method, delivery options, voicemail preference, attachment(s) preference, delivery methods.

Figure 12A:
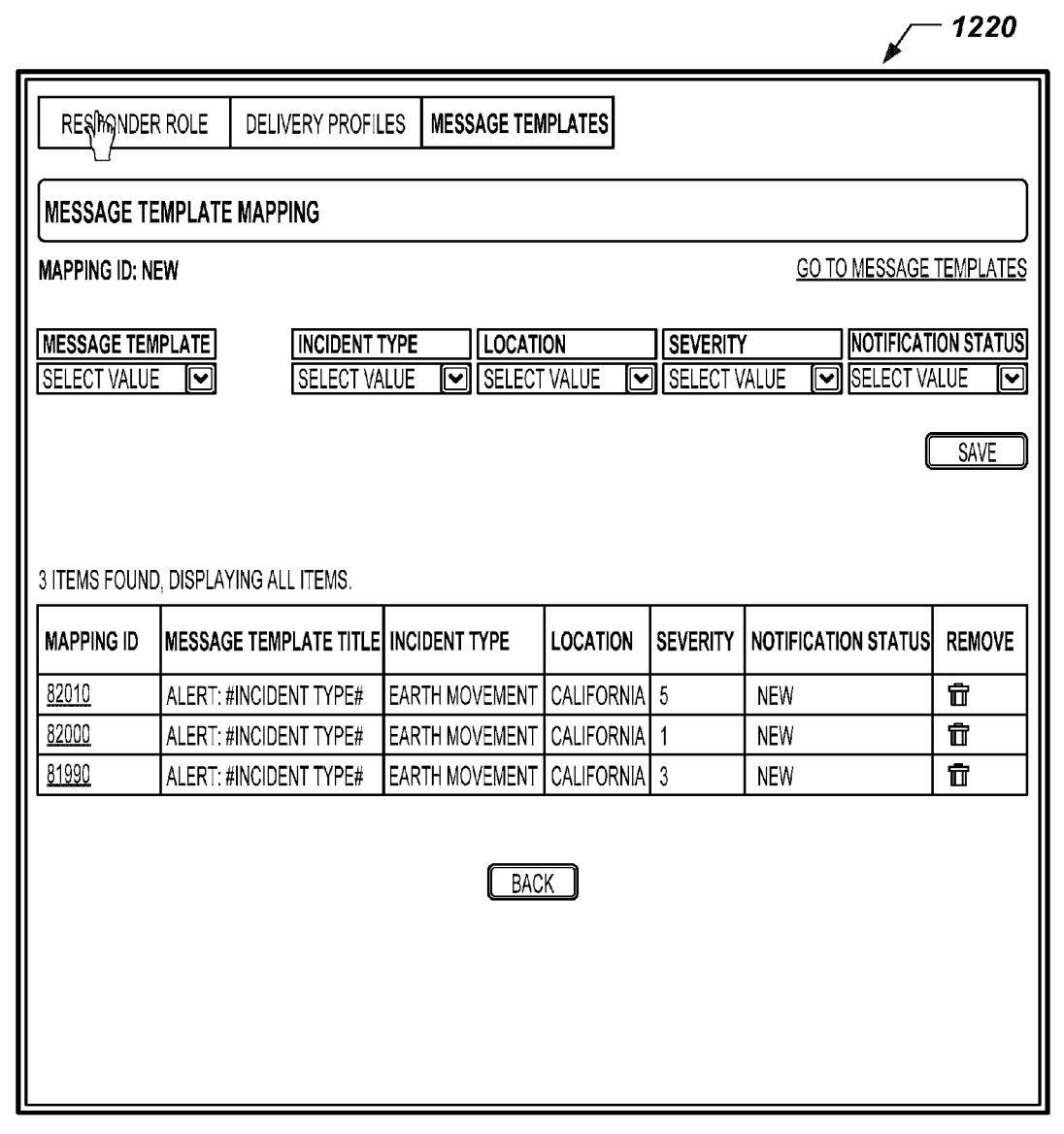

FIG. 12A shows the Message Template Mapping Page 1220. This page allows the user to select the message template to be assigned to an Incident Type, Location, Severity, and Notification Status combination to create a Message Template Mapping. The user may create, edit, or delete a Message Template Mapping. The user may select Go To Message Templates to create or delete message templates.

FIG. 12B shows the Message Template List Page 1240. This page allows the user to search and list available message templates. Selecting the New Message Template button redirects the user to the page where the user may enter a new message template.

FIG. 12C shows the Message Template Page 1260. This page allows the user to define a new message template. The user may enter the values that define the new message template, or may start by copying an existing message template. The following message template characteristics are specified as shown on page 1260: notification type, language, title, message, file attachments. The administrator of the incident communication system 100 can use "message variables" or data fields in the title or message body when setting up Message Templates, so that when the system sends the selected Message Template, the message variable (data field) is replaced by the corresponding data (e.g., "#Incident Type# in #Location#" is received by recipient as "Chemical spill in Building 123").

Figure 13:

FIG. 13 shows the Manage Responder Profiles and User Attributes Page 1300 of the incident communication system 100. In the Manage Member Profile section the administrator assigns each Responder (Member) with the desired Responder Profile and Location combination. In the User Attributes section the administrator assigns the desired attributes to the Responder (Member) as shown on page 1300. Members of the incident communication system 100 can have multiple Profiles, where they have multiple roles in multiple locations (e.g., Joe Smith has the role of "Security" in location "A" and "C" and the role of "Floor Warden" in location "A").

A multitude of computing devices may be used to implement the systems and methods described in this document, as either a client or as a server or plurality of servers. A computing device can be implemented in various forms of digital computers, such as laptops, desktops, workstations, personal digital assistants, servers, blade servers, mainframes, and other appropriate computers. Another computing device can be implemented in various forms of mobile devices, such as personal digital assistants, cellular telephones, smartphones, and other similar computing devices. Additionally, computing devices can include Universal Serial Bus (USB) flash drives. The USB flash drives may store operating systems and other applications. The USB flash drives can include input/output components, such as a wireless transmitter or USB connector that may be inserted into a USB port of another computing device. The components described here, their connections and relationships, and their functions, are meant to be exemplary only, and are not meant to limit implementations of the inventions described and/or claimed in this document.

A computing device can include a processor, memory, a storage device, a high-speed interface connecting to memory and high-speed expansion ports. The computing device can further include a low speed interface connecting to a low speed bus and a storage device. Each of the above components can be interconnected using various busses, and may be mounted on a common motherboard or in other manners as appropriate. The processor can process instructions for execution within the computing device, including instructions stored in the memory or on the storage device to display graphical information for a GUI on an external input/output device, such as a display coupled to high speed interface. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). The memory can store information within the computing device. In one implementation, the memory can be a volatile memory unit or units. In another implementation, the memory can be a non-volatile memory unit or units. The memory may also be another form of computer-readable medium, such as a magnetic or optical disk.

The storage device can provide mass storage for the computing device. In one implementation, the storage device may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory, the storage device, or memory on processor.

The high speed controller can manage bandwidth-intensive operations for the computing device, while the low speed controller can manage lower bandwidth-intensive operations. Such allocation of functions is exemplary only. In one implementation, the high-speed controller can be coupled to memory, to a display (e.g., through a graphics processor or accelerator), and to high-speed expansion ports, which may accept various expansion cards. In the implementation, low-speed controller can be coupled to the storage device and the low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device may be implemented in a number of different forms. For example, it may be implemented as a standard server, or multiple times in a group of such servers. It may also be implemented as part of a rack server system. In addition, it may be implemented in a personal computer such as a laptop computer. Alternatively, components from computing device may be combined with other components in a mobile device. Each of such devices may contain one or more computing devices or mobile devices, and an entire system may be made up of multiple computing devices and mobile devices communicating with each other.

A mobile device can include a processor, memory, an input/output device such as a display, a communication interface, and a transceiver, among other components. The mobile device may also be provided with a storage device, such as a microdrive or other device, to provide additional storage. Each of the above components is interconnected using various buses, and several of the components may be mounted on a common motherboard or in other manners as appropriate.

The processor can execute instructions within the mobile device, including instructions stored in the memory. The processor of the mobile device may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the mobile device, such as control of user interfaces, applications run by the mobile device, and wireless communication by the mobile device.

The processor of the mobile device may communicate with a user through control interface and display interface coupled to a display. The display may be, for example, a Thin-Film-Transistor Liquid Crystal display or an Organic Light Emitting Diode display, or other appropriate display technology. The display interface may comprise appropriate circuitry for driving the display to present graphical and other information to a user. The control interface may receive commands from a user and convert them for submission to the processor of the mobile device. In addition, an external interface may provide in communication with processor of the mobile device, to enable near area communication of the mobile device with other devices. The external interface may provide, for example, for wired communication in some implementations, or for wireless communication in other implementations, and multiple interfaces may also be used.

The memory stores information within the computing mobile device. The memory can be implemented as one or more of a computer-readable medium or media, a volatile memory unit or units, or a non-volatile memory unit or units. An expansion memory may also be provided and connected to the mobile device through an expansion interface, which may include, for example, a SIMM (Single In Line Memory Module) card interface. Such expansion memory may provide extra storage space for the mobile device, or may also store applications or other information for the mobile device. Specifically, expansion memory may include instructions to carry out or supplement the processes described above, and may include secure information also. Thus, for example, expansion memory may be provide as a security module for the mobile device, and may be programmed with instructions that permit secure use of device. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory, expansion memory, or memory on processor that may be received, for example, over transceiver or external interface.

The mobile device may communicate wirelessly through communication interface, which may include digital signal processing circuitry where necessary. Communication interface may provide for communications under various modes or protocols, such as GSM voice calls, SMS, EMS, or MMS messaging, CDMA, TDMA, PDC, WCDMA, CDMA2000, or GPRS, among others. Such communication may occur, for example, through a radio-frequency transceiver. In addition, short-range communication may occur, such as using a Bluetooth, WiFi, or other such transceiver (not shown). In addition, GPS (Global Positioning System) receiver module may provide additional navigation- and location-related wireless data to the mobile device, which may be used as appropriate by applications running on the mobile device.

The mobile device may also communicate audibly using audio codec, which may receive spoken information from a user and convert it to usable digital information. Audio codec may likewise generate audible sound for a user, such as through a speaker, e.g., in a handset of the mobile device. The sound may include sound from voice telephone calls, may include recorded sound (e.g., voice messages, music files, etc.) and may also include sound generated by applications operating on the mobile device.

The mobile computing device may be implemented in a number of different forms. For example, it may be implemented as a cellular telephone. It may also be implemented as part of a smartphone, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving, by a computer system as part of information about an incident affecting operations of an enterprise, an incident type, an incident location and an incident severity;
accessing, by the computer system in a data repository associated with the enterprise, (i) a plurality of responder profiles corresponding to a plurality of responders, (ii) a plurality of message templates for generating incident notifications, and (iii) a plurality of delivery profiles for sending incident notifications, wherein each of the plurality of responders has a contractual arrangement with the enterprise, wherein each of the plurality of responder profiles includes (I) associated responder responsibilities related to the type and severity of the incident, and (II) a location at which to perform the associated responder responsibilities;
identifying, by the computer system, one or more responder profiles from among the accessed plurality of responder profiles, wherein each of the one or more identified responder profiles includes responsibilities related to the received incident type and the received incident severity;
selecting, by the computer system after said identifying the one or more responder profiles, multiple responders from among the plurality of responders, wherein each of the selected multiple responders has a responder profile from among the identified one or more responder profiles that includes the received incident location;
selecting, by the computer system based on the received incident type, incident location and incident severity, a message template from among the accessed plurality of message templates and a delivery profile from among the accessed plurality of delivery profiles;
generating, by the computer system using the selected message template, a single incident notification for the selected multiple responders;
sending, by the computer system in accordance with the selected delivery profile, the single generated incident notification to the selected multiple responders;
receiving, by the computer system, confirmations of incident notification receipts from recipients of the incident notification from among the multiple responders to whom the incident notification was sent;
in response to receiving the confirmations of incident notification receipts, establishing, by the computer system, a teleconference bridge among the recipients of the incident notification from among the multiple responders to enable information exchange among the responders; and
iteratively receiving, by the computer system, additional information about the incident from at least some of the recipients of the incident notification, wherein for each iteration of said iteratively receiving, the computer system performs
updating an incident status and the received information about the incident based on the received additional information,
when the received additional information includes either an updated incident type or an updated incident severity,
identifying one or more other responder profiles from among the accessed plurality of responder profiles, wherein each of the one or more other responder profiles includes responsibilities related to the received updated incident type or the received updated incident severity, and
selecting, after said identifying the one or more other responder profiles, additional one or more responders from among the plurality of responders, wherein each of the additional one or more responders has a responder profile from among the identified one or more other responder profiles that includes the received incident location,
selecting, based on the updated information about the incident and the updated status, another message template from among the accessed plurality of message templates and another delivery profile from among the accessed plurality of delivery profiles,
generating, based on the selected other message template, another single incident notification that includes the updated incident status, and
sending, in accordance with the selected other delivery profile, the single generated other incident notification to the multiple recipients of the incident notification, and, when the received additional information includes either the updated incident type or the updated incident severity, also to the additional one or more responders.

2. The method of claim 1, wherein when the received additional information about the incident includes an indication of the incident having been solved, the computer system further performs
closing the incident and updating the incident status to correspond to the closure; and
sending, at least to the selected multiple responders, a single incident resolution notification.

3. The method as in claim 2, further comprising:
sending, by the computer system, the incident resolution notification to a resource responsible for originally identifying the incident.

4. The method of claim 1, wherein the single incident notification is sent simultaneously to the selected multiple responders.

5. The method of claim 1, wherein each of the plurality of delivery profiles comprises:
predetermined contact paths including one or more of cell phone, email, work phone, home phone, pager, text messaging, and fax; and
a predetermined number of contact attempts associated with each of the predetermined contact paths.

6. The method of claim 1, wherein for each of the multiple responders or the additional one or more responders,
the sending in accordance with the selected delivery profile or other delivery profile comprises repeatedly sending the single incident notification via one or more contact paths, and
the method further comprises:
receiving, by the computer system, indication of an incident notification delivery attempt to the responder; and
recording, by the computer system, an associated status of the delivery attempt, an associated delivery attempt count, an associated delivery attempt time, and, when applicable, an associated delivery confirmation time, as referenced by the received confirmation.

7. The method of claim 6, further comprising:
providing, by the computer system in real time, an incident notification log including an incident status, and for each of the selected multiple responders, at least the associated delivery status, the associated delivery count and a message included in the incident notification.

8. The method of claim 6, wherein
the confirmation of the incident notification receipt includes a type of response to the incident, and
the method further comprises displaying, by the computer system in real time, an incident notification report including the incident status and the received confirmations summarized by the type of response to the incident.

9. The method of claim 1, further comprising:
displaying, by the computer system the incident notification prior to sending.

10. The method of claim 9, further comprising:
receiving, by the computer system, edits to the selected message template prior to sending.

11. The method of claim 9, further comprising:
receiving, by the computer system, edits to a list of recipients including the multiple responders or the additional one or more responders.

12. The method of claim 11, wherein the receiving edits to the list of recipients comprises one or more of:
addition of a responder to the list of recipients; and
removal of a responder from the list of recipients.

13. The method of claim 12, wherein the receiving edits to the list of recipients further comprises addition of an original caller of the incident to the list of recipients.

14. The method of claim 9, further comprising:
receiving, by the computer system, edits to the selected delivery profile.

15. A system comprising:
one or more hardware processors; and
non-transitory computer storage medium encoding instructions that when executed by the one or more hardware processors cause the system to perform operations comprising:
receiving, as part of information about an incident affecting operations of an enterprise, an incident type, an incident location and an incident severity;
accessing, in a data repository associated with the enterprise, (i) a plurality of responder profiles corresponding to a plurality of responders, (ii) a plurality of message templates for generating incident notifications, and (iii) a plurality of delivery profiles for sending incident notifications, wherein each of the plurality of responders has a contractual arrangement with the enterprise, wherein each of the plurality of responder profiles includes (I) associated responder responsibilities related to the type and severity of the incident, and (II) a location at which to perform the associated responder responsibilities;
identifying one or more responder profiles from among the accessed plurality of responder profiles, wherein each of the one or more identified responder profiles includes responsibilities related to the received incident type and the received incident severity;
selecting, after the operation of identifying the one or more responder profiles, multiple responders from among the plurality of responders, wherein each of the selected multiple responders has a responder profile from among the identified one or more responder profiles that includes the received incident location;
selecting, based on the received incident type, incident location and incident severity, a message template from among the accessed plurality of message templates and a delivery profile from among the accessed plurality of delivery profiles;
generating, using the selected message template, a single incident notification for the selected multiple responders;
sending, in accordance with the selected delivery profile, the single generated incident notification to the selected multiple responders selected;
receiving confirmations of incident notification receipts from recipients of the incident notification from among the multiple responders to whom the incident notification was sent;
in response to receiving the confirmations of incident notification receipts, establishing a teleconference bridge among the recipients of the incident notification from among the multiple responders to enable information exchange among the responders; and
iteratively receiving additional information about the incident from at least some of the recipients of the incident notification,
wherein each iteration of the operation of receiving the additional information comprises
updating an incident status and the received information about the incident based on the received additional information,
when the received additional information includes either an updated incident type or an updated incident severity,
identifying one or more other responder profiles from among the accessed plurality of responder profiles, wherein each of the one or more other responder profiles includes responsibilities related to the received updated incident type or the received updated incident severity, and
selecting, after the operation of identifying the one or more other responder profiles, additional one or more responders from among the plurality of responders, wherein each of the additional one or more responders has a responder profile from among the identified one or more other responder profiles that includes the received incident location,
selecting, based on the updated information about the incident and the updated status, another message template from among the accessed plurality of message templates and another delivery profile from among the accessed plurality of delivery profiles,
generating, based on the selected other message template, another single incident notification that includes the updated incident status, and
sending, in accordance with the selected other delivery profile, the single generated other incident notification to the multiple recipients of the incident notification, and, when the received additional information includes either the updated incident type or the updated incident severity, also to the additional one or more responders.

16. A non-transitory computer storage medium encoded with a computer program, the program comprising instructions that when executed by data processing apparatus cause the data processing apparatus to perform operations comprising:

receiving, as part of information about an incident affecting operations of an enterprise, an incident type, an incident location and an incident severity;

accessing, in a data repository associated with the enterprise, (i) a plurality of responder profiles corresponding to a plurality of responders, (ii) a plurality of message templates for generating incident notifications, and (iii) a plurality of delivery profiles for sending incident notifications, wherein each of the plurality of responders has a contractual arrangement with the enterprise, wherein each of the plurality of responder profiles includes (I) associated responder responsibilities related to the type and severity of the incident, and (II) a location at which to perform the associated responder responsibilities;

identifying one or more responder profiles from among the accessed plurality of responder profiles, wherein each of the one or more identified responder profiles includes responsibilities related to the received incident type and the received incident severity;

selecting, after the operation of identifying the one or more responder profiles, multiple responders from among the plurality of responders, wherein each of the selected multiple responders has a responder profile from among the identified one or more responder profiles that includes the received incident location;

selecting, based on the received incident type, incident location and incident severity, a message template from among the accessed plurality of message templates and a delivery profile from among the accessed plurality of delivery profiles;

generating, using the selected message template, a single incident notification for the selected multiple responders;

sending, in accordance with the selected delivery profile, the single generated incident notification to the selected multiple responders;

receiving confirmations of incident notification receipts from recipients of the incident notification from among the multiple responders to whom the incident notification was sent;

in response to receiving the confirmations of incident notification receipts, establishing a teleconference bridge among the recipients of the incident notification from among the multiple responders to enable information exchange among the responders; and iteratively receiving additional information about the incident from at least some of the recipients of the incident notification, wherein each iteration of the operation of receiving the additional information comprises updating an incident status and the received information about the incident based on the received additional information, when the received additional information includes either an updated incident type or an updated incident severity, identifying one or more other responder profiles from among the accessed plurality of responder profiles, wherein each of the one or more other responder profiles includes responsibilities related to the received updated incident type or the received updated incident severity, and selecting, after the operation of identifying the one or more other responder profiles, additional one or more responders from among the plurality of responders, wherein each of the additional one or more responders has a responder profile from among the identified one or more other responder profiles that includes the received incident location, selecting, based on the updated information about the incident and the updated status, another message template from among the accessed plurality of message templates and another delivery profile from among the accessed plurality of delivery profiles, generating, based on the selected other message template, another single incident notification that includes the updated incident status, and sending, in accordance with the selected other delivery profile, the single generated other incident notification to the multiple recipients of the incident notification, and, when the received additional information includes either the updated incident type or the updated incident severity, also to the additional one or more responders.

17. The non-transitory computer storage medium of claim 16, wherein when the received additional information about the incident includes an indication of the incident having been solved, the operations further comprise closing the incident and updating the incident status to correspond to the closure; and sending, at least to the selected multiple responders, a single incident resolution notification.

18. The non-transitory computer storage medium as in claim 17, wherein the operations further comprise sending the incident resolution notification to a resource responsible for originally identifying the incident.

19. The non-transitory computer storage medium of claim 16, wherein the single incident notification is sent simultaneously to the selected multiple responders.

20. The non-transitory computer storage medium of claim 16, wherein each of the plurality of delivery profiles comprises:

predetermined contact paths including one or more of cell phone, email, work phone, home phone, pager, text messaging, and fax; and a predetermined number of contact attempts associated with each of the predetermined contact paths.

21. The non-transitory computer storage medium of claim 16, wherein for each of the multiple responders or the additional one or more responders, the operation of sending in accordance with the selected delivery profile or other delivery profile comprises repeatedly sending the single incident notification via one or more contact paths, and the operations further comprise:

receiving indication of an incident notification delivery attempt to the responder; and recording an associated status of the delivery attempt, an associated delivery attempt count, an associated delivery attempt time, and, when applicable, an associated delivery confirmation time, as referenced by the received confirmation.

22. The non-transitory computer storage medium of claim 21, wherein the operations further comprise:

providing, in real time, an incident notification log including an incident status, and for each of the responders, at least the associated delivery status, the associated delivery count and a message included in the incident notification.

23. The non-transitory computer storage medium of claim 21, wherein the confirmation of the incident notification receipt includes a type of response to the incident, and the operations further comprise displaying, in real time, an incident notification report including the incident status and the received confirmations summarized by the type of response to the incident.

24. The non-transitory computer storage medium of claim 16, wherein the operations further comprise displaying the incident notification prior to sending.

25. The system of claim 15, wherein when the received additional information about the incident includes an indication of the incident having been solved, the operations further comprise
closing the incident and updating the incident status to correspond to the closure; and
sending, at least to the selected multiple responders, a single incident resolution notification.

26. The system as in claim 25, wherein the operations further comprise sending the incident resolution notification to a resource responsible for originally identifying the incident.

27. The system of claim 15, wherein the single incident notification is sent simultaneously to the selected multiple responders.

28. The system of claim 15, wherein each of the plurality of delivery profiles comprises:
predetermined contact paths including one or more of cell phone, email, work phone, home phone, pager, text messaging, and fax; and
a predetermined number of contact attempts associated with each of the predetermined contact paths.

29. The system of claim 15, wherein for each of the multiple responders or the additional one or more responders,
the operation of sending in accordance with the selected delivery profile or other delivery profile comprises repeatedly sending the single incident notification via one or more contact paths, and
the operations further comprise:
receiving indication of an incident notification delivery attempt to the responder; and
recording an associated status of the delivery attempt, an associated delivery attempt count, an associated delivery attempt time, and, when applicable, an associated delivery confirmation time, as referenced by the received confirmation.

30. The system of claim 29, wherein the operations further comprise:
providing, in real time, an incident notification log including an incident status, and for each of the responders, at least the associated delivery status, the associated delivery count and a message included in the incident notification.

31. The system of claim 29, wherein
the confirmation of the incident notification receipt includes a type of response to the incident, and
the operations further comprise displaying, in real time, an incident notification report including the incident status and the received confirmations summarized by the type of response to the incident.

32. The system of claim 15, wherein the operations further comprise displaying the incident notification prior to sending.

* * * * *

UNITED STATES PATENT AND TRADEMARK OFFICE
CERTIFICATE OF CORRECTION

PATENT NO. : 8,417,553 B2
APPLICATION NO. : 12/579382
DATED : April 9, 2013
INVENTOR(S) : Cintawati W. Putra et al.

It is certified that error appears in the above-identified patent and that said Letters Patent is hereby corrected as shown below:

In the Claims

Column 20, line 36, before "performs" delete "further".

Column 21, line 19, delete "system" and insert -- system, -- therefor.

Signed and Sealed this
Second Day of July, 2013

Teresa Stanek Rea
*Acting Director of the United States Patent and Trademark Office*